United States Patent
Duluk, Jr. et al.

(10) Patent No.: US 6,268,875 B1
(45) Date of Patent: Jul. 31, 2001

(54) DEFERRED SHADING GRAPHICS PIPELINE PROCESSOR

(75) Inventors: Jerome F. Duluk, Jr., Palo Alto; Richard E. Hessel, Pleasanton; Vaughn T. Arnold, Scotts Valley; Jack Benkual, Cupertino; Joseph P. Bratt, San Jose; George Cuan, Sunnyvale; Stephen L. Dodgen, Boulder Creek; Emerson S. Fang, Fremont; Zhaoyu Gong, Cupertino; Thomas Y. Ho; Hengwei Hsu, both of Fremont; Sidong Li, San Jose; Sam Ng, Fremont; Matthew N. Papakipos, Menlo Park; Jason R. Redgrave, Mountain View; Sushma S. Trivedi, Sunnyvale; Nathan D. Tuck, San Diego, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/632,293

(22) Filed: Aug. 4, 2000

Related U.S. Application Data

(63) Continuation of application No. 09/378,299, filed on Aug. 20, 1999.
(60) Provisional application No. 60/097,336, filed on Aug. 20, 1998.

(51) Int. Cl.$^7$ .................................................. G06T 1/20
(52) U.S. Cl. ........................................... 345/506; 345/422
(58) Field of Search .................................... 345/419–422, 345/425–432, 501–503, 506–509, 523, 524, 521, 522, 530–532, 536, 537, 545, 561, 562

(56) References Cited

U.S. PATENT DOCUMENTS

| | | | |
|---|---|---|---|
| 5,574,836 | 11/1996 | Broemmelsiek | 395/127 |
| 5,699,497 | 12/1997 | Erdahl et al. | 395/128 |
| 5,710,876 | 1/1998 | Peercy et al. | 395/126 |
| 5,767,859 | 6/1998 | Rossin et al. | 345/434 |
| 5,864,342 | 1/1999 | Kajiya et al. | 345/418 |
| 5,880,736 | 3/1999 | Peercy et al. | 345/426 |
| 5,920,326 | 7/1999 | Rentschler et al. | 345/503 |
| 5,949,424 | 9/1999 | Cabral et al. | 345/426 |
| 6,002,412 | * 12/1999 | Schinnerer | 345/521 |

OTHER PUBLICATIONS

Peercy et al. "Efficient bump mapping hardware" (Computer Graphics Proceedings, Annual Conference Series, 1997 pp. 303–306).
Lathrop "Rendering (converting a scence to pixels)", (The Way Computer Graphics Works, Wiley Computer Publishing, 1997, John Wiley & Sons, Inc., Chapter 7, pp. 93–150).
Foley et al. "Illumination and shading" (Computer Graphics Principles and Practice (2nd edition in C, Addison–Wesley Publishing Co. 1996, Chapter 16, pp. 721–814).
Watt "Reflection and illumination models" (3D Computer Graphics, 2nd edition, Addison–Wesley, 1993, pp. 89–126).

* cited by examiner

Primary Examiner—Kee M. Tung
(74) Attorney, Agent, or Firm—Flehr Hohbach Test Albritton & Herbert LLP

(57) ABSTRACT

Three-dimensional computer graphics systems and methods and more particularly to structure and method for a three-dimensional graphics processor and having other enhanced graphics processing features. In one embodiment the graphics processor is a Deferred Shading Graphics Processor (DSGP) comprising an AGP interface, a command fetch & decode (2000), a geometry unit (3000), a mode extraction (4000) and polygon memory (5000), a sort unit (6000) and sort memory (7000), a setup unit (8000), a cull unit (9000), a mode injection (10000), a fragment unit (11000), a texture (12000) and texture memory (13000) a phong shading (14000), a pixel unit (15000), a backend unit (1600) coupled to a frame buffer (17000). Other embodiments need not include all of these functional units, and the structures and methods of these units are applicable to other computational processes and systems as well as deferred and non-deferred shading graphical processors.

31 Claims, 4 Drawing Sheets

DEFERRED SHADING GRAPHICS PIPELINE PROCESSOR

RELATED APPLICATIONS

This application is a continuation of Ser. No. 09/378,299 filed Aug. 20, 1999.

This application claims the benefit under 35 USC Section 119(e) of U.S. Provisional Patent Application Ser. No. 60/097,336 filed Aug. 20, 1998 and entitled GRAPHICS PROCESSOR WITH DEFERRED SHADING; which is hereby incorporated by reference.

This application is also related to the following U.S. patent applications, each of which are incorporated herein by reference:

Ser. No. 09/213,990, filed Dec. 17, 1998, entitled HOW TO DO TANGENT SPACE LIGHTING IN A DEFERRED SHADING ARCHITECTURE;

Ser. No. 09/378,598 filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed Aug. 20, 1999, entitled SYSTEM, APARATUS AND METHOD FOR SPATIALLY SORTING IMAGE DATA IN A THREE-DIMENSIONAL GRAPHICS PIPELINE;

Ser. No. 09/378,439 filed Aug. 20, 1999 entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No. 09/379,144, filed Aug. 20, 1999, entitled APPARATUS AND METHOD FOR GEOMETRY OPERATIONS IN A 3D GRAPHICS PIPELINE;

Ser. No. 09/372,137, filed Aug. 20, 1999, entitled APPARATUS AND METHOD FOR FRAGMENT OPERATIONS IN A 3D GRAPHICS PIPELINE; and Ser. No. 09/378,299 filed Aug. 20, 1999, entitled DEFERRED SHADING GRAPHICS PIPELINE PROCESSOR;

Ser. No. 09/378,598 filed Aug. 20, 1999 entitled METHOD AND APPARATUS FOR PERFORMING CONSERVATIVE HIDDEN SURFACE REMOVAL IN A GRAPHICS PROCESSOR WITH DEFERRED SHADING;

Ser. No. 09/377,503 filed Aug. 20, 1999 entitled Deferred Shading Graphics Pipeline Processor Having Advanced Features.

FIELD OF THE INVENTION

This invention relates to computing systems generally, to three-dimensional computer graphics, more particularly, and more most particularly to structure and method for a three-dimensional graphics processor implementing differed shading and other enhanced features.

BACKGROUND OF THE INVENTION

The Background of the Invention is divided for convenience into several sections which address particular aspects conventional or traditional methods and structures for processing and rendering graphical information. The section headers which appear throughout this description are provided for the convenience of the reader only, as information concerning the invention and the background of the invention are provided throughout the specification.

Three-dimensional Computer Graphics

Computer graphics is the art and science of generating pictures, images, or other graphical or pictorial information with a computer. Generation of pictures or images, is commonly called rendering. Generally, in three-dimensional (3D) computer graphics, geometry that represents surfaces (or volumes) of objects in a scene is translated into pixels (picture elements) stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are generally numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass. 1989, reprinted 1991, ISBN 0-201-15442-0 (hereinafter referred to as the Watt Reference), and herein incorporated by reference.

FIG. 1 shows a three-dimensional object, a tetrahedron, with its own coordinate axes ($x_{obj}$, $y_{obj}$, $z_{obj}$) The three-dimensional object is translated, scaled, and placed in the viewing point's coordinate system based on ($x_{eye}$, $y_{eye}$, $z_{eye}$). The object is projected onto the viewing plane, thereby correcting for perspective. At this point, the object appears to have become two-dimensional; however, the object's z-coordinates are preserved so they can be used later by hidden surface removal techniques. The object is finally translated to screen coordinates, based on ($x_{screen}$, $y_{screen}$, $z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z-buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: (1) the x-coordinate in pixel units (generally including a fraction); (2) the y-coordinate in pixel units (generally including a fraction); and (3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation. Thus, a z-coordinate value is generally included in each pixel value (along with the color value) as geometry is rendered.

Generic 3D Graphics Pipeline

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6, 1993, Computer Graphics Proceedings, Annual Conference Series, published by ACM SIGGRAPH, New York, 1993, Soft-cover ISBN 0-201-58889-7 and CD-ROM ISBN 0-201-56997-3, herein incorporated by references and referred to as the Deering Reference). The Deering Reference includes a diagram of a generic 3D graphics pipeline (i.e., a renderer, or a rendering system) which is reproduced here as FIG. 2.

As seen in FIG. 2, the first step within the floating-point intensive functions of the generic 3D graphics pipeline after the data input (Step 212) is the transformation step (Step 214). The transformation step is also the first step in the outer loop of the flow diagram, and also includes "get next polygon". The second step, the clip test, checks the polygon to see if it is at least partially contained in the view volume (sometimes shaped as a frustum) (Step 216). If the polygon is not in the view volume, it is discarded; otherwise processing continues. The third step is face determination, where polygons facing away from the viewing point are discarded (Step 218). Generally, face determination is applied only to objects that are closed volumes. The fourth step, lighting computation, generally includes the set up for Gouraud shading and/or texture mapping with multiple light sources of various types, but could also be set up for Phong shading or one of many other choices (Step 222). The fifth step, clipping, deletes any portion of the polygon that is outside of the view volume because that portion would not project within the rectangular area of the viewing plane (Step 224). Generally, polygon clipping is done by splitting the polygon into two smaller polygons that both project within the area of the viewing plane. Polygon clipping is computationally expensive. The sixth step, perspective divide, does perspective correction for the projection of objects onto the viewing plane (Step 226). At this point, the points representing vertices of polygons are converted to pixel space coordinates by step seven, the screen space conversion step (Step 228). The eighth step (Step 230), set up for incremental render, computes the various begin, end, and increment values needed for edge walking and span interpolation (e.g.: x, y, and z-coordinates; RGB color; texture map space u- and v-coordinates; and the like).

Within the drawing intensive functions, edge walking (Step 232) incrementally generates horizontal spans for each raster line of the display device by incrementing values from the previously generated span (in the same polygon), thereby "walking" vertically along opposite edges of the polygon. Similarly, span interpolation (Step 234) "walks" horizontally along a span to generate pixel values, including a z-coordinate value indicating the pixel's distance from the viewing point. Finally, the z-buffered blending also referred to as Testing and Blending (Step 236) generates a final pixel color value. The pixel values also include color values, which can be generated by simple Gouraud shading (i.e., interpolation of vertex color values) or by more computationally expensive techniques such as texture mapping (possibly using multiple texture maps blended together), Phong shading (i.e., per-fragment lighting), and/or bump mapping (perturbing the interpolated surface normal). After drawing intensive functions are completed, a double-buffered MUX output look-up table operation is performed (Step 238). In this figure the blocks with rounded corners typically represent functions or process operations, while sharp cornered rectangles typically represent stored data or memory.

By comparing the generated z-coordinate value to the corresponding value stored in the Z Buffer, the z-buffered blend either keeps the new pixel values (if it is closer to the viewing point than previously stored value for that pixel location) by writing it into the frame buffer, or discards the new pixel values (if it is farther). At this step, antialiasing methods can blend the new pixel color with the old pixel color. The z-buffered blend generally includes most of the per-fragment operations, described below.

The generic 3D graphics pipeline includes a double buffered frame buffer, so a double buffered MUX is also included. An output lookup table is included for translating color map values. Finally, digital to analog conversion makes an analog signal for input to the display device.

A major drawback to the generic 3D graphics pipeline is its drawing intensive functions are not deterministic at the pixel level given a fixed number of polygons. That is, given a fixed number of polygons, more pixel-level computation is required as the average polygon size increases. However, the floating-point intensive functions are proportional to the number of polygons, and independent of the average polygon size. Therefore, it is difficult to balance the amount of computational power between the floating-point intensive functions and the drawing intensive functions because this balance depends on the average polygon size.

Prior art Z buffers are based on conventional Random Access Memory (RAM or DRAM), Video RAM (VRAM), or special purpose DRAMs. One example of a special purpose DRAM is presented in "FBRAM: A new Form of Memory Optimized for 3D Graphics", by Deering, Schlapp, and Lavelle, pages 167 to 174 of SIGGRAPH94 Proceedings, July 24–29, 1994, Computer Graphics Proceedings, Annual Conference Series, published by ACM SIGGRAPH, New York, 1994, Soft-cover ISBN 0201607956, and herein incorporated by reference.

Pipeline State

OpenGL is a software interface to graphics hardware which consists of several hundred functions and procedures that allow a programmer to specify objects and operations to produce graphical images. The objects and operations include appropriate characteristics to produce color images of three-dimensional objects. Most of OpenGL (Version 1.2) assumes or requires a that the graphics hardware include a frame buffer even though the object may be a point, line, polygon, or bitmap, and the operation may be an operation on that object. The general features of OpenGL (just one example of a graphical interface) are described in the reference "The OpenGL® Graphics System: A Specification (Version 1.2) edited by Mark Segal and Kurt Akeley, Version 1.2, March 1998; and hereby incorporated by reference. Although reference is made to OpenGL, the invention is not limited to structures, procedures, or methods which are compatible or consistent with OpenGL, or with any other standard or non-standard graphical interface. Desirably, the inventive structure and method may be implemented in a manner that is consistent with the OpenGL, or other standard graphical interface, so that a data set prepared for one of the standard interfaces may be processed by the inventive structure and method without modification. However, the inventive structure and method provides some features not provided by OpenGL, and even when such generic input/output is provided, the implementation is provided in a different manner.

The phrase "pipeline state" does not have a single definition in the prior-art. The OpenGL specification, for example, sets forth the type and amount of the graphics rendering machine or pipeline state in terms of items of state and the number of bits and bytes required to store that state information. In the OpenGL definition, pipeline state tends to include object vertex pertinent information including for example, the vertices themselves the vertex normals, and color as well as "non-vertex" information.

When information is sent into a graphics renderer, at least some object geometry information is provided to describe the scene. Typically, the object or objects are specified in terms of vertex information, where an object is modeled, defined, or otherwise specified by points, lines, or polygons (object primitives) made up of one or more vertices. In simple terms, a vertex is a location in space and may be specified for example by a three-space (x,y,z) coordinate relative to some reference origin. Associated with each vertex is other information, such as a surface normal, color, texture, transparency, and the like information pertaining to the characteristics of the vertex. This information is essentially "per-vertex" information. Unfortunately, forcing a one-to-one relationship between incoming information and vertices as a requirement for per-vertex information is unnecessarily restrictive. For example, a color value may be specified in the data stream for a particular vertex and then not respecified in the data stream until the color changes for a subsequent vertex. The color value may still be characterized as per-vertex data even though a color value is not explicitly included in the incoming data stream for each vertex.

Texture mapping presents an interesting example of information or data which could be considered as either per-vertex information or pipeline state information. For each object, one or more texture maps may be specified, each texture map being identified in some manner, such as with a texture coordinate or coordinates. One may consider the texture map to which one is pointing with the texture coordinate as part of the pipeline state while others might argue that it is per-vertex information.

Other information, not related on a one-to-one basis to the geometry object primitives, used by the renderer such as lighting location and intensity, material settings, reflective properties, and other overall rules on which the renderer is operating may more accurately be referred to as pipeline state. One may consider that everything that does not or may not change on a per-vertex basis is pipeline state, but for the reasons described, this is not an entirely unambiguous definition. For example, one may define a particular depth test to be applied to certain objects to be rendered, for example the depth test may require that the z-value be strictly "greater-than" for some objects and "greater-than-or equal-to" for other objects. These particular depth tests which change from time to time, may be considered to be pipeline state at that time. Parameters considered to be renderer (pipeline) state in OpenGL are identified in Section 6.2 of the afore referenced OpenGL Specification (Version 1.2, at pages 193–217).

Essentially then, there are two types of data or information used by the renderer: (1) primitive data which may be thought of as per-vertex data, and (ii) pipeline state data (or simply pipeline state) which is everything else. This distinction should be thought of as a guideline rather than as a specific rule, as there are ways of implementing a graphics renderer treating certain information items as either pipeline state or non-pipeline state.

Per-Fragment Operations

In the generic 3D graphics pipeline, the "z-buffered blend" step actually incorporates many smaller "per-fragment" operational steps. Application Program Interfaces (APIs), such as OpenGL (Open Graphics Library) and D3D, define a set of per-fragment operations (See Chapter 4 of Version 1.2 OpenGL Specification). We briefly review some exemplary OpenGL per-fragment operations so that any generic similarities and differences between the inventive structure and method and conventional structures and procedures can be more readily appreciated.

Under OpenGL, a frame buffer stores a set of pixels as a two-dimensional array. Each picture-element or pixel stored in the frame buffer is simply a set of some number of bits. The number of bits per pixel may vary depending on the particular GL implementation or context.

Corresponding bits from each pixel in the frame buffer are grouped together into a bit plane; each bit plane containing a single bit from each pixel. The bit planes are grouped into several logical buffers referred to as the color, depth, stencil, and accumulation buffers. The color buffer in turn includes what is referred to under OpenGL as the front left buffer, the front right buffer, the back left buffer, the back right buffer, and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bit planes, but particular implementations of context may not provide right buffers, back buffers, or auxiliary buffers at all, and an implementation or context may additionally provide or not provide stencil, depth, or accumulation buffers.

Under OpenGL, the color buffers consist of either unsigned integer color indices or R, G, B, and, optionally, a number "A" of unsigned integer values; and the number of bit planes in each of the color buffers, the depth buffer (if provided), the stencil buffer (if provided), and the accumulation buffer (if provided), is fixed and window dependent. If an accumulation buffer is provided, it should have at least as many bit planes per R, G, and B color component as do the color buffers.

A fragment produced by rasterization with window coordinates of $(x_w, y_w)$ modifies the pixel in the frame buffer at that location based on a number of tests, parameters, and conditions. Noteworthy among the several tests that are typically performed sequentially beginning with a fragment and its associated data and finishing with the final output stream to the frame buffer are in the order performed (and with some variation among APIs): 1) pixel ownership test; 2) scissor test; 3) alpha test; 4) Color Test; 5) stencil test; 6) depth test; 7) blending; 8) dithering; and 9) logicop. Note that the OpenGL does not provide for an explicit "color test" between the alpha test and stencil test. Per-Fragment operations under OpenGL are applied after all the color computations.

BRIEF DESCRIPTION OF THE DRAWINGS

For a better understanding of the nature and objects of the invention, reference should be made to the following detailed description taken in conjunction with the accompanying drawings, in which.

SUMMARY

Figure 1:
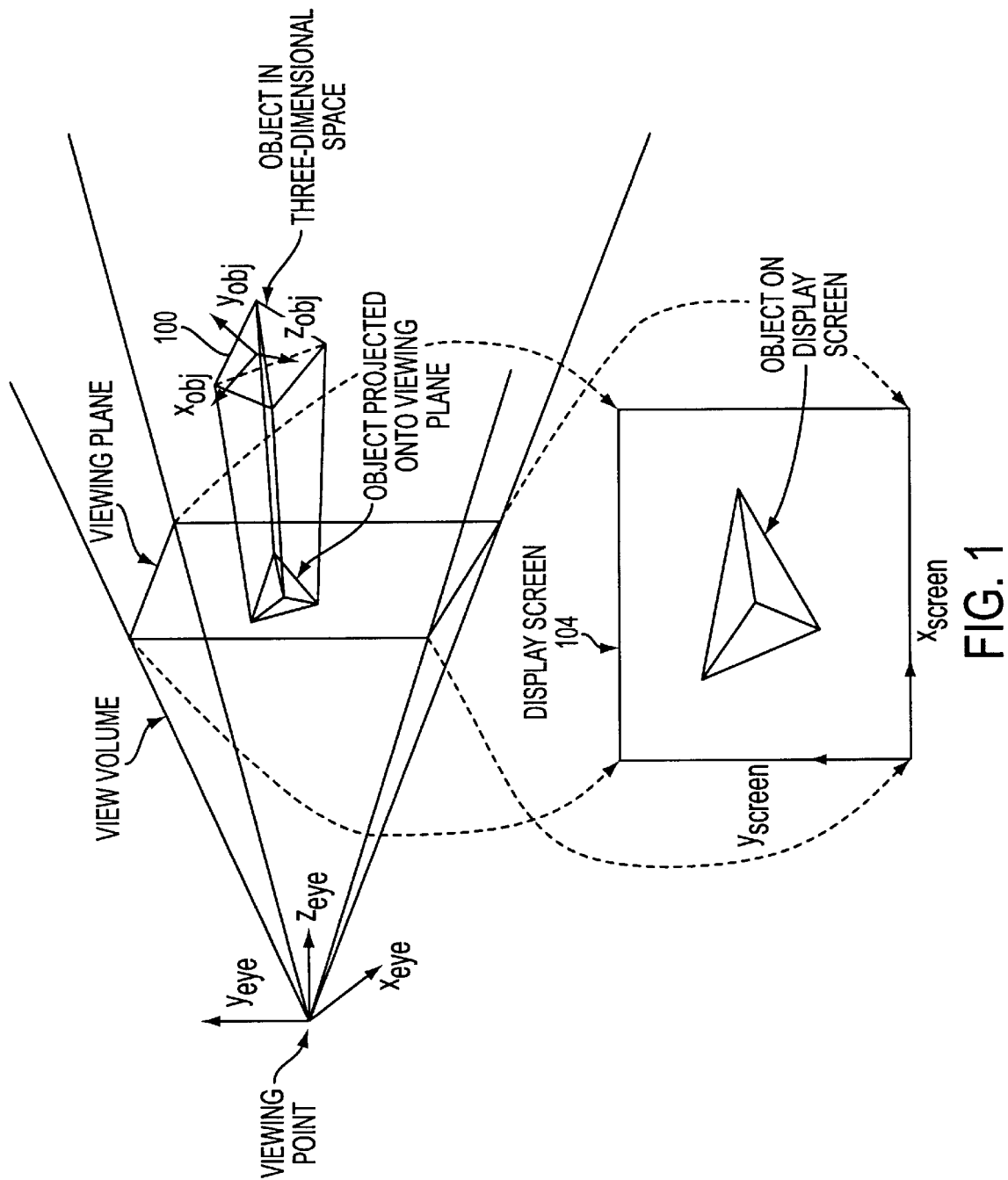
FIG. 1 shows a three-dimensional object, a tetrahedron, with its own coordinate axes.
Figure 2:
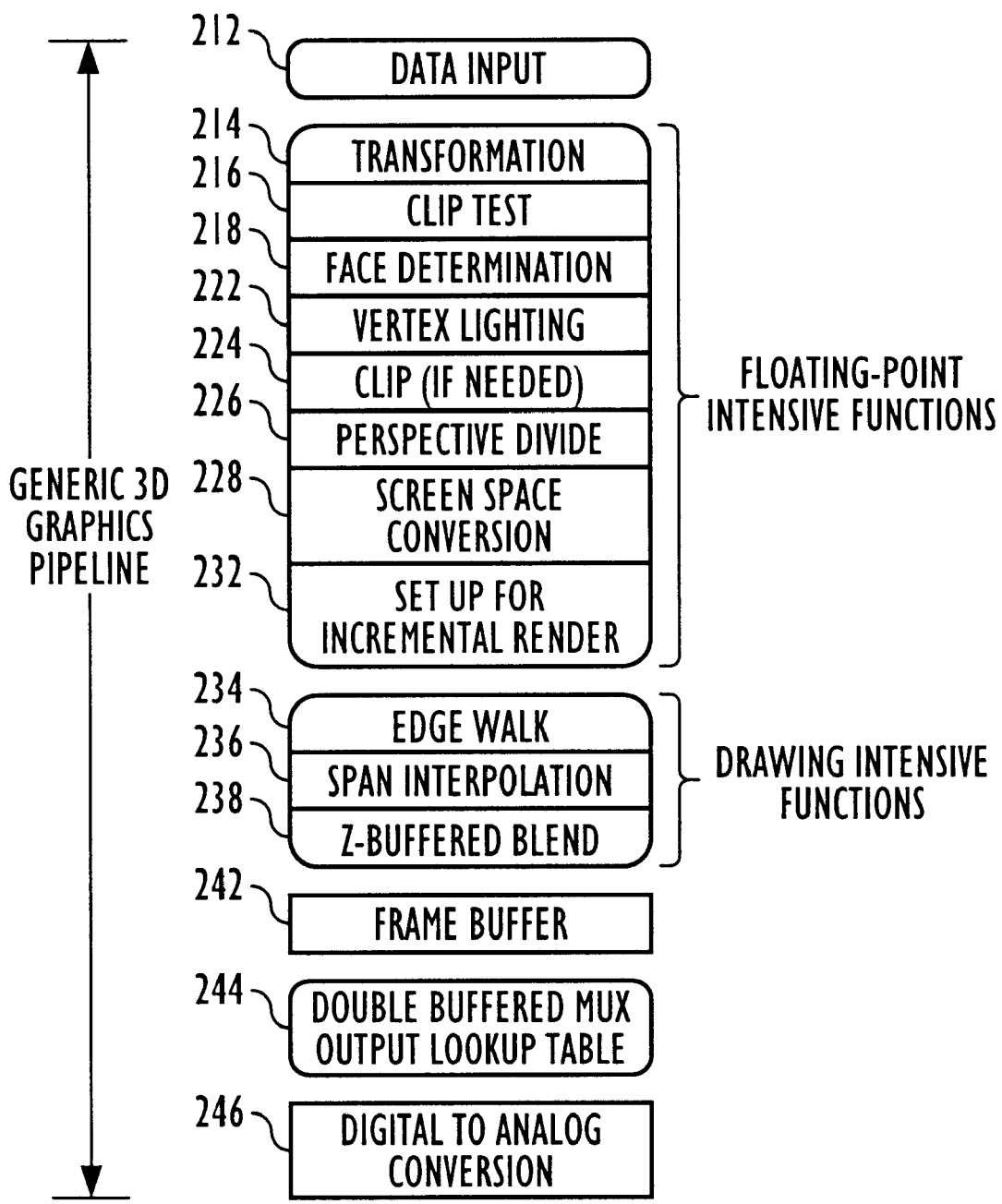
FIG. 2 is a diagrammatic illustration showing an exemplary generic 3D graphics pipeline or renderer.

In one aspect the invention provides structure and method for a deferred graphics pipeline processor. The pipeline processor advantageously includes one or more of a command fetch and decode unit, geometry unit, a mode extraction unit and a polygon memory, a sort unit and a sort memory, setup unit, a cull unit, a mode injection unit, a fragment unit, a texture unit, a Phong lighting unit, a pixel unit, and backend unit coupled to a frame buffer. Each of these units may also be used independently in connection with other processing schemes and/or for processing data other than graphical or image data.

In another aspect the invention provides a command fetch and decode unit communicating inputs of data and/or command from an external computer via a communication channel and converting the inputs into a series of packets, the packets including information items selected from the group consisting of colors, surface normals, texture coordinates, rendering information, lighting, blending modes, and buffer functions.

In still another aspect, the invention provides structure and method for a geometry unit receiving the packets and performing coordinate transformations, decomposition of all polygons into actual or degenerate triangles, viewing volume clipping, and optionally per-vertex lighting and color calculations needed for Gouraud shading.

In still another aspect, the invention provides structure and method for a mode extraction unit and a polygon memory associated with the polygon unit, the mode extraction unit receiving a data stream from the geometry unit and separating the data stream into vertices data which are communicated to a sort unit and non-vertices data which is sent to the polygon memory for storage.

In still another aspect, the invention provides structure and method for a sort unit and a sort memory associated with the sort unit, the sort unit receiving vertices from the mode extraction unit and sorts the resulting points, lines, and triangles by tile, and communicating the sorted geometry by means of a sort block output packet representing a complete primitive in tile-by-tile order, to a setup unit.

In still another aspect, the invention provides structure and method for a setup unit receiving the sort block output packets and calculating spatial derivatives for lines and triangles on a tile-by-tile basis one primitive at a time, and communicating the spatial derivatives in packet form to a cull unit.

In still another aspect, the invention provides structure and method for a cull unit receiving one tile of data at a time and having a Magnitude Comparison Content Addressable Memory (MCCAM) Cull sub-unit and a Subpixel Cull sub-unit, the MCCAM Cull sub-unit being operable to discard primitives that are hidden completely by previously processed geometry, and the Subpixel Cull sub-unit processing the remaining primitives which are partly or entirely visible, and determines the visible fragments of those remaining primitives, the Subpixel Cull sub-unit outputting one stamp worth of fragments at a time.

In still another aspect, the invention provides structure and method for a mode injection unit receiving inputs from the cull unit and retrieving mode information including colors and material properties from the Polygon Memory and communicating the mode information to one or more of a fragment unit, a texture unit, a Phong unit, a pixel unit, and a backend unit; at least some of the fragment unit, the texture unit, the Phong unit, the pixel unit, or the backend unit including a mode cache for cache recently used mode information; the mode injection unit maintaining status information identifying the information that is already cached and not sending information that is already cached, thereby reducing communication bandwidth.

In still another aspect, the invention provides structure and method for a fragment unit for interpolating color values for Gouraud shading, interpolating surface normals for Phong shading and texture coordinates for texture mapping, and interpolating surface tangents if bump maps representing texture as a height field gradient are in use; the fragment unit performing perspective corrected interpolation using barycentric coefficients.

In still another aspect, the invention provides structure and method for a texture unit and a texture memory associated with the texture unit; the texture unit applying texture maps stored in the texture memory, to pixel fragments; the textures being MIP-mapped and comprising a series of texture maps at different levels of detail, each map representing the appearance of the texture at a given distance from an eye point; the texture unit performing tri-linear interpolation from the texture maps to produce a texture value for a given pixel fragment that approximate the correct level of detail; the texture unit communicating interpolated texture values to the Phong unit on a per-fragment basis.

In still another aspect, the invention provides structure and method for a Phong lighting unit for performing Phong shading for each pixel fragment using material and lighting information supplied by the mode injection unit, the texture colors from the texture unit, and the surface normal generated by the fragment unit to determine the fragment's apparent color; the Phong block optionally using the interpolated height field gradient from the texture unit to perturb the fragment's surface normal before shading if bump mapping is in use.

In still another aspect, the invention provides structure and method for a pixel unit receiving one stamp worth of fragments at a time, referred to as a Visible Stamp Portion, where each fragment has an independent color value, and performing pixel ownership test, scissor test, alpha test, stencil operations, depth test, blending, dithering and logic operations on each sample in each pixel, and after accumulating a tile worth of finished pixels, blending the samples within each pixel to antialias the pixels, and communicating the antialiased pixels to a Backend unit.

In still another aspect, the invention provides structure and method for backend unit coupled to the pixel unit for receiving a tile's worth of pixels at a time from the pixel unit, and storing the pixels into a frame buffer.

DETAILED DESCRIPTION OF EMBODIMENTS OF THE INVENTION

Deferred Shading Graphics Processor (DSGP) 1000

Figure 3:
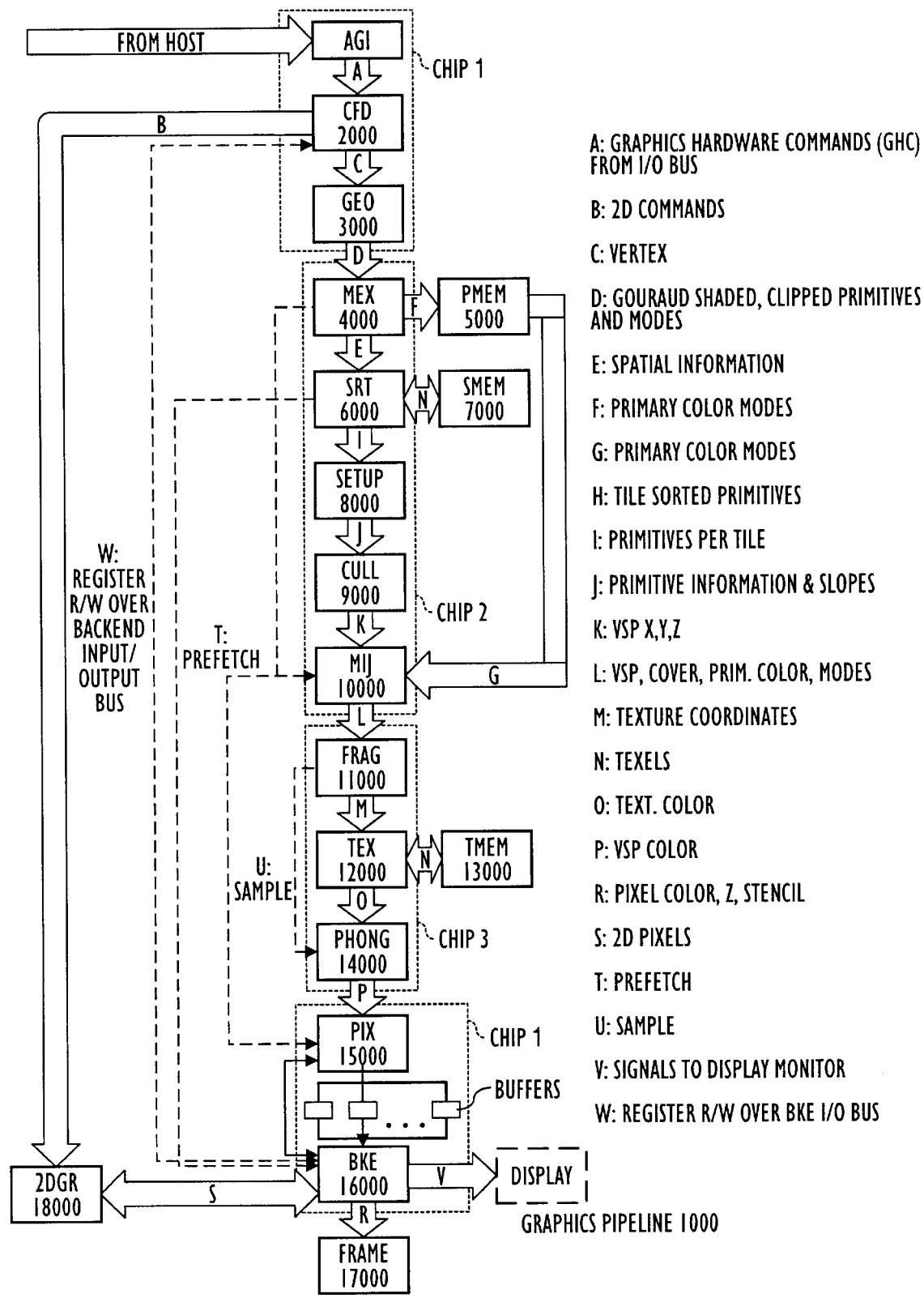
FIG. 3 is an illustration showing an exemplary embodiment of the inventive Deferred Shading Graphics Processor (DSGP).
Figure 4:
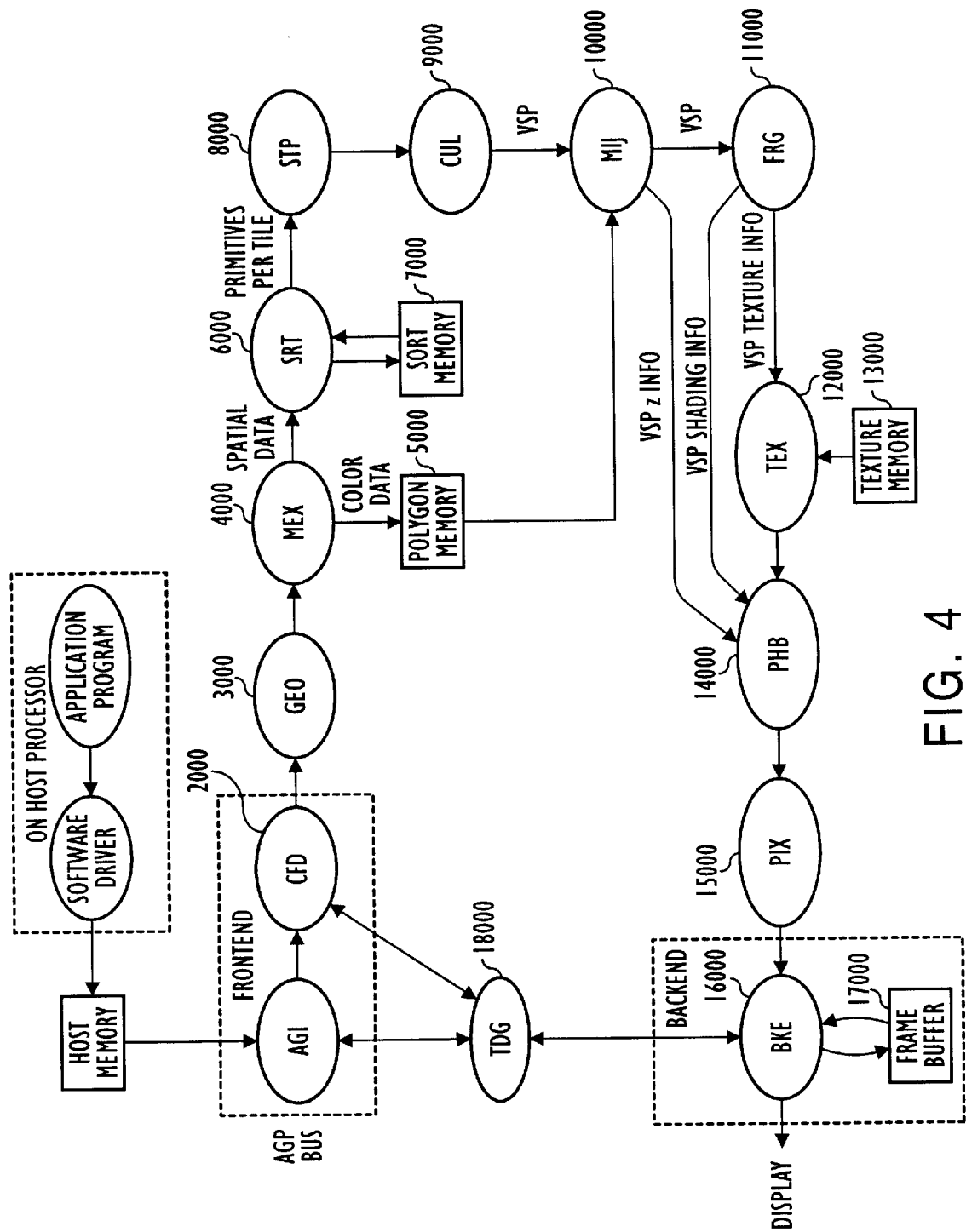
FIG. 4 is an illustration showing an alternative exemplary embodiment of the inventive Deferred Shading Graphics Processor (DSGP).

Am embodiment of the inventive Deferred Shading Graphics Processor (DSGP) 1000 is illustrated in FIG. 3 and described in detail hereinafter. An alternative embodiment of the invention is illustrated in FIG. 4. The detailed description which follows is with reference to FIG. 3 and FIG. 4, without further specific reference. Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor is hereinafter referred to as the DSGP (for Deferred Shading Graphics Processor), or the DSGP pipeline, but is sometimes referred to as the pipeline.

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D APIs. The OpenGL specification, entitled "The OpenGL Graphics System: A Specification (Version 1.2)" by Mark Segal and Kurt Akeley, edited by Jon Leech, is included incorporated by reference.

The inventive structure and method provided for packetized communication between the functional blocks of the pipeline.

The term "Information" as used in this description means data and/or commands, and further includes any and all protocol handshaking, headers, address, or the like. Information may be in the form of a single bit, a plurality of bits, a byte, a plurality of bytes, packets, or any other form. Data also used synonymously with information in this application. The phase "information items" is used to refer to one or more bits, bytes, packets, signal states, addresses, or the like. Distinctions are made between information, data, and commands only when it is important to make a distinction for the particular structure or procedure being described. Advantageously, embodiments of the inventive processor provides unique physical addresses for the host, and supports packetized communication between blocks.

Host Processor (HOST)

The host may be any general purpose computer, workstation, specialized processor, or the like, capable of sending commands and data to the Deferred Shading Graphics Processor. The AGP bus connects the Host to the AGI which communicates with the AGP bus. AGI implements AGP protocols which are known in the art and not described in detail here.

CFD communicates with AGI to tell it to get more data when more data can be handled, and sometimes CFD will receive a command that will stimulate it to go out and get additional commands and data from the host, that is it may stimulate AGI to fetch additional Graphics Hardware Commands (GHC).

Advanced Graphics Interface (AGI)

The AGI block is responsible for implementing all the functionality mandated by the AGP and/or PCI specifications in order to send and receive data to host memory or the CPU. This block should completely encapsulate the asynchronous boundary between the AGP bus and the rest of the chip. The AGI block should implement the optional Fast Write capability in the AGP 2.0 specification in order to allow fast transfer of commands. The AGI block is connected to the Read/Write Controller, the DMA Controller and the Interrupt Control Registers on CFD.

Command Fetch & Decode (CFD) 2000

Command Fetch and Decode (CFD) 2000 handles communication with the host computer through the AGI I/O bus also referred to as the AGP bus. CFD is the unit between the AGP/AGI interface and the hardware that actually draws pictures, and receives an input consisting of Graphics Hardware Commands (GHC) from Advanced Graphics Interface (AGI) and converts this input into other steams of data, usually in the form of a series of packets, which it passes to the Geometry (GEO) block 3000, to the 2-Dimensional Graphics Engine block (TDG) 18000, and to Backend (BKE) 16000. In one embodiment, each of the AGI, TDG, GEO, and CFD are co-located on a common integrated circuit chip. The Deferred Shading Graphics Processor (DSGP) 1000 (also referred to as the "graphics pipeline" or simply as "pipeline" in this document) is largely, though not exclusively, packet communication based. Most of what the CFD does is to route data for other blocks. A stream of data is received from the host via AGI and this stream may be considered to be simply a steam of bits which includes command and control (including addresses) and any data associated with the commands or control. At this stage, these bits have not been categorized by the pipeline nor packetized, a task for which CFD is primarily responsible. The commands and data come across the AGP bus and are routed by CFD to the blocks which consume them. CFD also does some decoding and unpacking of received commands, manages the AGP interface, and gets involved in Direct Memory Access (DMA) transfers and retains some state for context switches. Context switches (in the form of a command token) include may be received by CFD and in simple terms identify a pipeline state switching event so that the pipeline (or portions thereof) can grab the current (old) state and be ready to receive new state information. CFD identifies and consumes the context switch command token.

Most of the input stream comprises commands and data. This data includes geometrical object data. The descriptions of these geometrical objects can include colors, surface normals, texture coordinates, as well as other descriptors as described in greater detail below. The input stream also contains rendering information, such as lighting, blending modes, and buffer functions. Data routed to 2DG can include texture and image data.

In this description, it will be realized that certain signals or packets are generated in a unit, other signals or packets are consumed by a unit (that is the unit is the final destination of the packet), other signals or packets are merely passed through a unit unchanged, while still others are modified in some way. The modification may for example include a change in format, a splitting of a packet into other packets, a combining of packets, a rearrangement of packets, or derivation of related information from one or more packets to form a new packet. In general, this description identifies the packet or signal generator block and the signal or packet consuming block, and for simplicity of description may not describe signals or packets that merely pass through or are propagated through blocks from the generating unit to the consuming unit. Finally, it will be appreciated that in at least one embodiment of the invention, the functional blocks are distributed among a plurality of chips (three chips in the preferred embodiment exclusive of memory) and that some signal or packet communication paths are followed via paths that attempt to get a signal or packet onto or off of a particular chip as quickly as possible or via an available port or pin, even though that path does not pass down the pipeline in "linear" manner. These are implementation specific architectural features, which are advantageous for the particular embodiments described, but are not features or limitations of the invention as a whole. For example, in a single chip architecture, alternate paths may be provided.

We now describe the CFD-TDG Interface 2001 in terms of information communicated (sent and/or received) over the interface with respect to the list of information items identified in Table 1. CFD-TDG Interface 2001 includes a 32-bit (31:0) command bus and a sixty-four bit (63:0) data bus. (The data bus may alternatively be a 32-bit bus and sequential write operations used to communicate the data when required.) The command bus communicates commands atomically written to the AGI from the host (or written using a DMA write operation). Data associated with a command will or may come in later write operations over the data bus. The command and the data associated with the command (if any) are identified in the table as "command bus" and "data bus" respectively, and sometimes as a "header bus". Unless otherwise indicated relative to particular signals or packets, command, data, and header are separately communicated between blocks as an implementation decision or because there is an advantage to having the command or header information arrive separately or be directed to a separate sub-block within a pipeline unit. These details are described in the detailed description of the particular pipeline blocks in the related applications.

CFD sends packets to GEO. A Vertex_1 packet is output to GEO when a vertex is read by CFD and GEO is operating in full performance vertex mode, a Vertex_2 packet is output when GEO is operating in one-half performance vertex mode, a Vertex_3 packet is output when GEO is operating in one-third performance vertex mode. These performance modes are described in greater detail relative to GEO below. Reference to an action, process, or step in a major functional block, such as in CFD, is a reference to such action, process, or step either in that major block as a whole or within a portion of that major block. Propagated Mode refers to propagation of signals through a block. Consumed Mode refers to signals or packets that are consumed by the receiving unit. The Geometry Mode Packet (GMD) is sent whenever a Mode Change command is read by CFD. The Geometry Material Packet (MAT) is sent whenever a Material Command is detected by CFD. The ViewPort Packet (VP) is sent whenever a ViewPort Offset is detected by CFD. The Bump Packet (BMP) and Matrix Packet (MTX) are also sent by CFD. The Light Color Packet (LITC) is sent whenever a Light Color Command is read by CFD. The Light State Packet (LITS) is sent whenever a Light State Command is read by CFD.

There is also a communication path between CFD and BKE. The stream of bits arriving at CFD from AGI are either processed by CFD or directed unprocessed to 2DG based on the address arriving with the input. This may be thought of as an almost direct communication path or link between AGI and 2DG as the amount of handling by CFD for 2DG bound signals or packets is minimal and without interpretation.

More generally, in at least one embodiment of the invention, the host can send values to or retrieve values from any unit in the pipeline based on a source or destination address. Furthermore, each pipeline unit has some registers or memory areas that can be read from or written to by the host. In particular the host can retrieve data or values from BKE. The backend bus (BKE bus) is driven to a large extent by 2DG which can push or pull data. Register reads and writes may also be accomplished via the multi-chip communication loop.

TABLE 1

CFD->GEO Interface

| Ref. # | | |
|---|---|---|
| 2002 | Vertex_1 Command Bus | Full performance vertex cmd. |
| 2003 | Vertex_1 Data Bus | Full performance vertex data |
| 2004 | Vertex_2 Command Bus | Half performance vertex cmd. |
| 2005 | Vertex_2 Data Bus | Half performance vertex data |
| 2006 | Vertex_3 Command Bus | Third performance vertex cmd. |
| 2007 | Vertex_3 Data Bus | Third performance vertex data |
| 2008 | Consumed Mode - Geometry Mode (GMD) Command Bus | Mode Change cmd. |
| 2009 | Consumed Mode - Geometry Mode (GMD) Data Bus | |
| 2010 | Consumed Mode - Material Packet (MAT) Command Bus | Material cmd. |
| 2011 | Consumed Mode - Material Packet (MAT) Data Bus | Material data |
| 2012 | Consumed Mode - ViewPort Packet (VP) Command Bus | |
| 2013 | Consumed Mode - ViewPort Packet (VP) Data Bus | |
| 2014 | Consumed Mode - Bump Packet (BMP) Command Bus | |
| 2015 | Consumed Mode - Bump Packet (BMP) Data Bus | |
| 2016 | Consumed Mode - Light Color Packet (LITC) Command Bus | |
| 2017 | Consumed Mode - Light Color Packet (LITC) Data Bus | |
| 2018 | Consumed Mode - Light State Packet (LITS) Command Bus | |
| 2019 | Consumed Mode - Light State Packet (LITS) Data Bus | |
| 2020 | Consumed Mode - Matrix Packet (MTX) Command Bus | |
| 2021 | Consumed Mode - Matrix Packet (MTX) Data Bus | |
| 2022 | Propagated Mode Command Bus | |
| 2023 | Propagated Mode Data Bus | |
| 2024 | Propagated Vertex Command Bus | |
| 2025 | Propapated Vertex Data Bus | |

Geometry (GEO) 3000

The Geometry block (GEO) 3000 is the first computation unit at the front end of DSGP and receives inputs primarily from CFD over the CFD-GEO Interface 2001. GEO handles four major tasks: transformation of vertex coordinates and normals; assembly of vertices into triangles, lines, and points; clipping; and per-vertex lighting calculations needed for Gouraud shading. First, the Geometry block transforms incoming graphics primitives into a uniform coordinate space, the so called "world space". Then it clips the primitives to the viewing volume, or frustum. In addition to the six planes that define the viewing volume (left, right, top, bottom, front, and back), DSGP 1000 provides six user-definable clipping planes. After clipping, the GEO breaks polygons with more than three vertices into sets of triangles, to simplify processing. Finally, if there is any Gouraud shading in the frame, GEO calculates the vertex colors that the FRG 11000 uses to perform the shading.

DSGP can operate in maximum performance mode when only a certain subset of its operational features are in use. In performance mode (P-mode), GEO carries out only a subset of all possible operations for each primitive. As more operational features are selectively enabled, the pipeline moves through a series of lower-performance modes, such as half-performance (½P-mode), one-third performance (⅓P-mode), one-fourth performance (¼P-mode), and the like. GEO is organized to provide so that each of a plurality of GEO computational elements may be used for required computations. GEO reuses the available computational elements to process primitives at a slower rate for the non-performance mode settings.

The DSGP front end (primarily AGI and CFD) deals with fetching and decoding the Graphics Hardware Commands (GHC), and GEO receives from CFD and loads the necessary transform matrices (Matrix Packet (MTX), material and light parameters (e.g. Geometry Material Packet (MAT), Bump Packet (BMP), Light Color Packet (LITC), Light State Packet (LITS)) ,and other mode settings (e.g. Geometry Mode (GMD), ViewPort Packet (VP)) into GEO input registers.

At its output, GEO sends transformed vertex coordinates (e.g. Spatial Packet), normals, generated and/or transformed texture coordinates (e.g. TextureA, TextureB Packets), and per-vertex colors, including generated or propagated vertex (e.g. Color Full, Color Half, Color Third, Color Other, Spatial), to the Mode Extraction block (MEX) 4000 and to the Sort block (SRT) 6000. MEX stores the color data (which actually includes more than just color) and modes in the Polygon memory (PMEM) 5000. SRT organizes the per-vertex "spatial" data by tile and writes it into the Sort Memory (SMEM) 7000. Certain of these signals are fixed length while others are variable length and are identified in the GEO-MEX Interface 3001 in Table 2.

GEO operates on vertices that define geometric primitives:points, lines, triangles, quadralaterals, and polygons. It performs coordinate transformations and shading operations on a per-vertex basis. Only during a primitive assembly procedural phase does GEO group vertices together into lines and triangles (in the process, it breaks down quadrilaterals and polygons into sets of triangles). It performs clipping and surface tangent generation for each primitive.

For the Begin Frame, End Frame, Clear, Cull Modes, Spatial Modes, Texture A Front/Back, Texture B Front/Back, Material Front/Back, Light, PixelModes, and Stipple packets indicated as being Propagated Mode from CFD to GEO to MEX, these packets are propagated from CFD to GEO to MEX. Spatial Packet, Begin Frame, End Frame, Clear, and Cull Modes are also communicated from MEX to SRT. The bits that will form the packets arrive over the AGP, CFD interprets them and forms them into packets. GEO receives them from CFD and passes them on (propagates them) to MEX. MEX stores them into memory PMEM 5000 for subsequent use. The Color Full, Color Half, Color Third, and Color Other identify what the object or primitive looks like and are created by GEO from the received Vertex_1, Vertex_2, or Vertex_3. The Spatial Packet identifies the location of the primitive or object. Table 2 identifies signals and packets communicated over the MEX-PMEM-MIJ Interface. Table 3 identifies signals and packets communicated over the GEO-→MEX Interface.

TABLE 2

MEX-PMEM-MIJ Interface

| | |
|---|---|
| Color Full | Generated or propagated vertex |
| Color Half | Generated or propagated vertex |
| Color Third | Generated or propagated vertex |
| Color Other | Generated or propagated vertex |
| Spatial Modes | Propagated Mode from CFD |
| Texture A | Propagated Mode from CFD (variable Length) |
| Texture B | Propagated Mode from CFD (variable Length) |
| Material | Propagated Mode from CFD (variable Length) |
| Light | Propagated Mode from CFD (variable Length) |
| PixelModes | Propagated Mode from CFD (variable Length) |
| Stipple | Propagated Mode from CFD (variable Length) |

TABLE 3

GEO->MEX Interface

| | |
|---|---|
| Color Full | Generated by GEO - Generated or propagated vertex |
| Color Half | Generated by GEO - Generated or propagated vertex |
| Color Third | Generated by GEO - Generated or propagated vertex |
| Color Other | Generated by GEO - Generated or propagated vertex |
| Spatial Packet | Generated by GEO - Generated or propagated vertex |
| Begin Frame | Propagated Mode from CFD to GEO to MEX |
| End Frame | Propagated Mode from CFD to GEO to MEX |
| Clear | Propagated Mode from CFD to GEO to MEX |
| Cull Modes | Propagated Mode from CFD to GEO to MEX |
| Spatial Modes | Propagated Mode from CFD to GEO to MEX |
| Texture A Front/Back | Propagated Mode from CFD to GEO to MEX (variable Length) |
| Texture B Front/Back | Propagated Mode from CFD to GEO to MEX (variable Length) |
| Material Front/Back | Propagated Mode from CFD to GEO to MEX (variable Length) |
| Light | Propagated Mode from CFD to GEO to MEX (variable Length) |
| PixelModes | Propagated Mode from CFD to GEO to MEX (variable Length) |
| Stipple | Propagated Mode from CFD to GEO to MEX (variable Length) |

Mode Extraction (MEX) 4000 and Polygon Memory (PMEM) 5000

The Mode Extraction block 4000 receives an input information stream from GEO as a sequence of packets. The input information stream includes several information items from GEO, including Color Full, Color Half, Color Third, Color Other, Spatial, Begin Frame, End Frame, Clear, Spatial Modes, Cull Modes, Texture A Front/Back, Texture B Front/Back, Material Front/Back, Light, PixelModes, and Stipple, as already described in Table 2 for the GEOMEX Interface 3100. The Color Full, Color Half, Color Third, Color Other packets are collectively referred to as Color Vertices or Color Vertex.

MEX separates the input stream into two parts: (i) spatial information, and (ii) shading information. Spatial information consist of the Spatial Packet, Begin Frame, End Frame, Clear, Cull Modes packets, and are sent to SRT 6000. Shading information includes lights ( e.g. Light Packet), colors (e.g. Color Full, Color Half, Color Third, Color Other packets), texture modes (e.g. Texture A Front/Back, Texture B Front/Back packets), and other signals and packets (e.g. Spatial Modes, Material Front/Back, PixelModes, and Stipple packets), and is stored in a special buffer called the Polygon Memory (PMEM) 5000, where it can be retrieved by Mode Injection (MIJ) block 10000. PMEM is desirably double buffered, so MIJ can read data for one frame, while the MEX is storing data for the next frame.

The mode data (e.g. PixelMode, Spatial Mode) stored in PMEM conceptually may be placed into three major categories: per-frame data (such as lighting and including the Light packet), per-primitive data (such as material properties and including the Material Front/Back, Supple, Texture A Front/Back, and Texture B Front/Back packets) and per-vertex data (such as color and including the Color Full, Color Half, Color Third, Color Other packets). In fact, in the preferred embodiment, MEX makes no actual distinction between these categories as although some types of mode data has a greater likelihood of changing frequently (or less frequently), in reality any mode data can change at any time.

For each spatial packet MEX receives, it repackages it with a set of pointers into PMEM. The set of pointers includes a color Address, a colorOffset, and a colorType which are used to retrieve shading information from PMEM. The Spatial Packet also contains fields indicating whether the vertex represents a point, the endpoint of a line, or the corner of a triangle. The Spatial Packet also specifies whether the current vertex forms the last one in a given object primitive (i.e., "completes" the primitive). In the case of triangle "strips" or "fans", and line "strips" or "loops", the vertices are shared between adjacent primitives. In this case, the packets indicate how to identify the other vertices in each primitive.

MEX, in conjunction with the MIJ, is responsible for the management of shaded graphics state information. In a traditional graphics pipeline the state changes are typically incremental; that is, the value of a state parameter remains in effect until it is explicitly changed. Therefore, the applications only need to update the parameters that change. Furthermore, the rendering of primitives is typically in the order received. Points, lines, triangle strips, triangle fans, polygons, quads, and quad strips are examples of graphical primitives. Thus, state changes are accumulated until the spatial information for a primitive is received, and those accumulated states are in effect during the rendering of that primitive.

In DSGP, most rendering is deferred until after hidden surface removal. Visibility determination may not be deferred in all instances. GEO receives the primitives in order, performs all vertex operations (transformations, vertex lighting, clipping, and primitive assembly), and sends the data down the pipeline. SRT receives the time ordered data and bins it by the tiles it touches. (Within each tile, the list is in time order.) The Cull (CUL) block 9000 receives the data from SRT in tile order, and culls out parts of the primitives that definitely (conservative culling) do not contribute to the rendered images. CUL generates Visible Stamp Portions (VSPs), where a VSP corresponds to the visible portion of a polygon on the stamp as described in greater detail relative to CUL. The Texture (TEX) block 12000 and the Phong Shading (PHG) block 14000 receive the VSPs and are respectively responsible for texturing and lighting fragments. The Pixel (PIX) block 15000 consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline (rather than what may be referred to as the current state for a primitive now entering the pipeline), and recall that state every time it is visited by the pipeline stages downstream from SRT. MEX is a logic block between GEO and SRT that collects and saves the temporally ordered state change data, and attaches appropriate pointers to the primitive vertices in order to associate the correct state with the primitive when it is rendered. MIJ is responsible for the retrieval of the state and any other information associated with the state pointer (referred to here as the MLM Pointer, or MLMP) when it is needed. MIJ is also responsible for the repackaging of the information as appropriate. An example of the repackaging occurs when the vertex data in PMEM is retrieved and bundled into triangle input packets for FRG.

The graphics shading state affects the appearance of the rendered primitives. Different parts of the DSGP pipeline use different state information. Here, we are only concerned with the pipeline stages downstream from GEO. DSGP breaks up the graphics state into several categories based on how that state information is used by the various pipeline stages. The proper partitioning of the state is important. It can affect the performance (by becoming bandwidth and access limited), size of the chips (larger caches and/or logic complications), and the chip pin count.

MEX block is responsible for the following functionality: (a) receiving data packets from GEO; (b) performing any reprocessing needed on those data packets; (c) appropriately saving the information needed by the shading portion of the pipeline in PMEM for retrieval later by MIJ; (d) attaching state pointers to primitives sent to SRT, so that MIJ knows the state associated with this primitive; (d) sending the information needed by SRT, Setup (STP), and CUL to SRT, SRT acting as an intermediate stage and propagating the information down the pipeline; and (e) handling PMEM and SMEM overflow. The state saved in PMEM is partitioned and used by the functional blocks downstream from MIJ, for example by FRG, TEX, PHG, and PIX. This state is partitioned as described elsewhere in this description.

The SRT-STP-CUL part of the pipeline converts the primitives into VSPs. These VSPs are then textured and lit by the FRG-TEX-PHG part of the pipeline. The VSPs output from CUL to MIJ are not necessarily ordered by primitives. In most cases, they will be in the VSP scan order on the tile, i.e. the VSPs for different primitives may be interleaved. The FRG-TEX-PHG part of the pipeline needs to know which primitive a particular VSP belongs to. MIJ decodes the color pointer, and retrieves needed information from the PMEM. The color pointer consists of three parts, the colorAddress, colorOffset, and colorType.

MEX thus accumulates any state changes that have happened since the last state save. and keeps a state vector on chip. The state changes become effective as soon as a vertex is encountered. MEX attaches a colorPointer (or color address), a colorOffset, and a colorType with every primitive vertex sent to SRT. The colorPointer points to a vertex entry in PMEM. The colorOffset is the number of vertices separating the vertex at the colorPointer to the dual-oct that is used to store the MLMP applicable to this primitive.

The colorType tells the MIJ how to retrieve the complete primitive from the PMEM. Vertices are stored in order, so the vertices in a primitive are adjacent, except in the case of triangle fans. For points, we only need the vertex pointed to by the colorPointer. For lines we need the vertex pointed to by ColorPointer and the vertex before this. For triangle strips, we need the vertex at colorPointer and two previous vertices. For triangle fans we need the vertex at colorPointer, the vertex before that, and the first vertex after MLMP.

MEX does not generally need to know the contents of most of the packets received by it. It only needs to know their type and size. There are some exceptions to this generalization which are now described.

For certain packets, including colorFull, colorHalf, colorThird, colorOther packets, MEX needs to know the information about the primitive defined by the current vertex. In particular, MEX needs to know its primitive type (point, line, triangle strip, or triangle fan) as identified by the colPrimType field, and if a triangle—whether it is front facing or back facing. This information is used in saving appropriate vertex entries in an on-chip storage to be able to construct the primitive in case of a memory overflow. This information is encapsulated in a packet header sent by GEO to MEX.

MEX accumulates material and texture data for both front and back faces of the triangle. Only one set of state is written to PMEM based on the Front bit or flag indicator contained in the colorFull, colorHalf, colorThird, colorOther, TextureA, TextureB, and Material packets. Note that the front/back orientation does not change in a triangle strip or triangle fan. The Front bit is used to associate correct TextureA, TextureB parameters and Material parameters with the primitive. If a mesh changes orientation somewhere within the mesh, GEO will break that mesh into two or more meshes such that each new mesh is either entirely front facing or entirely back facing.

Similarly, for the Spatial Modes packet, MEX needs to be able to strip away one of the LineWidth and PointWidth attributes of the Spatial Mode Packet depending on the primitive type. If the vertex defines a point then LineWidth is thrown away and if the vertex defines a line, then PointWidth is thrown away. MEX passes down only one of the line or point width to SRT in the form of a LinePointWidth in the MEX-SRT Spatial Packet.

In the case of Clear control packets, MEX examines to see if SendToPixel flag is set. If this flag is set, then MEX saves the PixelMode data received in the PixelMode Packet from GEO in PMEM (if necessary) and creates an appropriate ColorPointer to attach to the output clear packet so that it may be retrieved by MIJ when needed. Table 4 identifies signals and packets communicated over the MEX-SRT Interface.

TABLE 4

| MEX->SRT Interface |
| --- |
| MEX->SRT Interface - Spatial |
| MEX->SRT Interface - Cull Modes |
| MEX->SRT Interface - Begin Frame |
| MEX->SRT Interface - End Frame |
| MEX->SRT Interface - Clear |

Sort (SRT) 6000 and Sort Memory (SMEM) 7000

The Sort (SRT) block 6000 receives several packets from MEX, including Spatial, Cull Modes, EndFrame, BeginFrame, and Clear Packets. For the vertices received from MEX, SRT sorts the resulting points, lines, and triangles by tile. SRT maintains a list of vertices representing the graphic primitives, and a set of Tile Pointer Lists, one list for each tile in the frame, in a desirably double-buffered Sort Memory (SMEM) 7000. SRT determines that a primitive has been completed. When SRT receives a vertex that completes a primitive (such as the third vertex in a triangle), it checks to see which tiles the primitive touches. For each Tile a primitive touches, SRT adds a pointer to the vertex to that tile's Tile Pointer List. When SRT has finished sorting all the geometry in a frame, it sends the primitive data (Primitive Packet) to STP. Each SRT output packet (Primitive Packet) represents a complete primitive. SRT sends its output in: (i) tile-by-tile order: first, all of the primitives that touch a given tile; then, all of the primitives that touch the next tile; and so on; or (ii) in sorted transparency mode order. This means that SRT may send the same primitive many times, once for each tile it touches. SRT also sends to STP CullMode, BeginFrame, EndFrame, BeginTile, and Clear Packets.

SRT is located in the pipeline between MEX and STP. The primary function of SRT is to take in geometry and determine which tiles that geometry covers. SRT manages the SMEM, which stores all the geometry for an entire scene before it is rasterized, along with a small amount of mode information. SMEM is desirably a double buffered list of vertices and modes. One SMEM page collects a scene's geometry (vertex-by-vertex and mode-by-mode), while the other SMEM page is sending its geometry (primitive by primitive and mode by mode) down the rest of the pipeline. SRT includes two processes that operate in parallel: (a) the Sort Write Process; and (b) the Sort Read Process. The Sort Write Process is the "master" of the two, because it initiates the Sort Read Process when writing is completed and the read process is idle. This also advantageously keeps SMEM from filling and overflowing as the write process limits the number of reads that may otherwise fill the SMEM buffer. In one embodiment of the invention SMEM is located on a separate chip different from the chip on which SRT is located, however, they may advantageously located on the same chip or substrate. For this reason, the communication paths between SRT and SMEM are not described in detail here, as in at least one embodiment, the communications would be performed within the same functional block (e.g. the Sort block). The manner in which SRT interacts with SMEM are described in the related applications.

An SRT-MIJ interface is provided to propagates Prefetch Begin Frame, Prefetch End Frame, and Prefetch Begin Tile. In fact these packets are destined to BKE via MIJ and PIX, and the provision of this SRT-MIJ-PIX-BKE communication path is used because MIJ represents the last block on the chip on which SRT is located. Prefetch packets go around the pipeline so BKE can do read operations from the Frame Buffer ahead of time, that is earlier than if the same packets were to propagate through the pipeline. MIJ has a convenient communication channel to the chip that contains BKE, and PIX is located on the same chip as BKE, the ultimate consumer of the packet. Therefore, sending the packet to MIJ is an implementation detail rather than an item of architectural design. On the other hand, the use of alternative paths described to facilitate communications between blocks on different physical chips is beneficial to this embodiment. Table 5 identifies signals and packets communicated over the SRT-MIJ-PIX-BKE Interface, and Table 6 identifies signals and packets communicated over the SRT-STP Interface.

TABLE 5

| SRT-MIJ-PIX-BKE Interface |
| --- |
| SRT-MIJ Interface - Prefetch Begin Tile |
| SRT-MIJ Interface - Prefetch End Frame |
| SRT-MIJ Interface - Prefetch Begin Frame |

TABLE 6

| SRT->STP Interface |
| --- |
| SRT->STP Interface - Primitive Packet |
| SRT->STP Interface - Cull Modes |
| SRT->STP Interface - Begin Frame |
| SRT->STP Interface - End Frame |

TABLE 6-continued

| SRT->STP Interface |
| --- |
| SRT->STP Interface - Begin Tile |
| SRT->STP Interface - Clear |

Setup (STP) 8000

The Setup (STP) block 8000 receives a stream of packets (Primitive Packet, Cull Modes, Begin Frame, End Frame, Begin Tile, and Clear Packets) from SRT. These packets have spatial information about the primitives to be rendered. The primitives and can be filled triangles, line triangles, lines, stippled lines, and points. Each of these primitives can be rendered in aliased or anti-aliased mode. STP provides unified primitives descriptions for triangles and line segments, post tile sorting setup and tile relative y-values and screen relative x-values. SRT sends primitives to STP (and other pipeline stages downstream) in tile order. Within each tile the data is organized in either "time order" or "sorted transparency order". STP processes one tile's worth of data, one primitive at a time. When it's done with a primitive, it sends the data on to CUL in the form of a Primitive Packet. CUL receives data from STP in tile order (in fact in the same order that STP receives primitives from SRT), and culls out or removes parts of the primitives that definitely do not contribute to the rendered images. (It may leave some parts of primitives if it cannot determine for certain that they will not contribute to the rendered image.) STP also breaks stippled lines into separate line segments (each a rectangular region), and computes the minimum z value for each primitive within the tile. Each Primitive Packet output from STP represents one primitive: a triangle, line segment, or point. The other inputs to STP including CullModes, BeginFrame, EndFrame, BeginTile, and Clear. Some packets are not used by STP but are merely propagated or passed through to CUL.

STP prepares the incoming primitives from SRT for processing (culling) by CUL. The CUL culling operation is accomplished in two stages. We briefly describe culling here so that the preparatory processing performed by STP in anticipation of culling may be more readily understood. The first stage, a magnitude comparison content addressable memory based culling operation (M-Cull), allows detection of those elements in a rectangular memory array whose content is greater than a given value. In one embodiment of the invention a magnitude comparison content addressable type memory is used. (By way of example but not limitation, U.S. Pat. No. 4,996,666, by Jerome F. Duluk Jr., entitled "Content-Addressable Memory System Capable of Fully Parallel Magnitude Comparisons", granted Feb. 26, 1991 herein incorporated by reference describes a structure for a particular magnitude comparison content addressable type memory.) The second stage (S-Cull) refines on this search by doing a sample-by-sample content comparison. STP produces a tight bounding box and minimum depth value Zmin for the part of the primitive intersecting the tile for M-Cull. The M-Cull stage marks the stamps in the bounding box that may contain depth values less than Zmin. The S-Cull stage takes these candidate stamps, and if they are a part of the primitive, computes the actual depth value for samples in that stamp. This more accurate depth value is then used for comparison and possible discard on a sample by sample basis. In addition to the bounding box and Zmin for M-Cull, STP also computes the depth gradients, line slopes, and other reference parameters such as depth and primitive intersection points with the tile edge for the S-Cull stage. CUL produces the VSPs used by the other pipeline stages.

STP is therefore responsible for receiving incoming primitives from SRT in the form of Primitive Packets, and processing these primitives with the aid of information received in the CullModes, BeginFrame, EndFrame, BeginTile, and Clear packets; and outputting primitives (Primitive Packet), as well as CullModes, BeginFrame, EndFrame, BeginTile, and Clear packets.

TABLE 7

STP->CUL Interface

STP->CUL Interface - Primitive Packet
STP->CUL Interface - Cull Modes
STP->CUL Interface - Begin Frame
STP->CUL Interface - End Frame
STP->CUL Interface - Begin Tile
STP->CUL Interface - Clear Cull (CUL) 9000

The Cull (CUL) block 9000 performs two main high-level functions. The primary function is to remove geometry that is guaranteed to not affect the final results in the frame buffer (i.e., a conservative form of hidden surface removal). The second function is to break primitives into units of stamp portions, where a stamp portion is the intersection of a particular primitive with a particular stamp. The stamp portion amount is determined by sampling. CUL is one of the more complex blocks in DSGP 1000, and processing within CUL is divided primarily into two steps: magnitude comparison content addressable memory culling(M-Cull), and Subpixel Cull (S-Cull). CUL accepts data one tile's worth at a time. M-Cull discards primitives that are hidden completely by previously processed geometry. S-Cull takes the remaining primitives (which are partly or entirely visible), and determines the visible fragments. S-Cull outputs one stamp's worth of fragments at a time, called a Visible Stamp Portion (VSP), a stamp based geometry entity. In one embodiment, a stamp is a 2×2 pixel area of the image. Note that a Visible Stamp Portion produced by CUL contains fragments from only a single primitive, even if multiple primitives touch the stamp. Colors from multiple touching VSPs are combined later, in the Pixel (PIX) block. Each pixel in a VSP is divided up into a number of samples to determine how much of the pixel is covered by a given fragment. PIX uses this information when it blends the fragments to produce the final color for the pixel.

CUL is responsible for: (a) pre-shading hidden surface removal; and (b) breaking down primitive geometry entities (triangles, lines and points) into stamp based geometry entities (VSPs). In general, CUL performs conservative culling or removal of hidden surfaces. CUL can only conservatively remove hidden surfaces, rather than exactly removing hidden surfaces, because it does not handle some "fragment operations" such as alpha test and stencil test, the results of which may sometimes be required to make such exact determination. CUL's sample z-buffer can hold two depth values, but CUL can only store the attributes of one primitive per sample. Thus, whenever a sample requires blending colors from two pieces of geometry, CUL has to send the first primitive (using time order) down the pipeline, even though there may be later geometry that hides both pieces of the blended geometry.

CUL receives STP Output Primitive Packets that each describe, on a per tile basis, either a triangle, a line or a point. SRT is the unit that bins the incoming geometry entities to tiles. Recall that STP pre-processed the primitives to provide more detailed geometric information in order to permit CUL to do the hidden surface removal. STP pre-calculates the slope value for all the edges, the bounding box of the primitive within the tile, (front most) minimum depth value of the primitive within the tile, and other relevant data, and sends this data to CUL in the form of packets. Recall that prior to SRT, MEX has already extracted the information of color, light, texture and related mode data and placed it in PMEM for later retrieval by MIJ, CUL only gets the mode data that is relevant to CUL and colorPointer (or colorAddress), that points to color, light, and texture data stored in PMEM.

CUL sends one VSP (Vsp Packet) at a time to MIJ, and MIJ reconnects the VSP with its color, light and texture data retrieved from PMEM and sends both the VSP and its associated color, light, and texture data in the form of a packet to FRG and later stages in the pipeline. Associated color is stored in PMEM. CUL outputs Vsps to MIJ and included with the Vsps is a pointer into polygon memory (PMEM) so that the associated color, light, and texture data for the Vsp can be retrieved from the memory. Table 8 identifies signals and packets communicated over thee CUL-MIJ Interface.

TABLE 8

CUL->MIJ Interface Description

CUL-MIJ Interface - Vsp (Visible Stamp Portion)
CUL-MIJ Interface - Begin Tile
CUL-MIJ Interface - Begin Frame
CUL-MIJ Interface - End Frame
CUL-MIJ Interface - Clear Mode Injection (MIJ) 10000

The Mode Injection (MIJ) block 10000 in conjunction with MEX is responsible for the management of graphics state related information. MIJ retrieves mode information—such as colors, material properties, and so on—earlier stored in PMEM by MEX, and injects it into the pipeline to pass downstream as required. To save bandwidth, individual downstream blocks cache recently used mode information so that when cached there is no need use bandwidth to communicated the mode information from MIJ to the destination needing it. MIJ keeps track of what information is cached downstream, and by which block, and only sends information as necessary when the needed information is not cached.

MIJ receives VSP packets from the CUL block. Each VSP packet corresponds to the visible portion of a primitive on the 2×2 pixel stamp. The VSPs output from the Cull block to MIJ block are not necessarily ordered by primitives. In most cases, they will be in the VSP scan order on the tile, that is, the VSPs for different primitives may be interleaved. In order to light, texture and composite the fragments in the VSPs, the pipeline stages downstream from the MIJ block need information about the type of the primitive (i.e. point, line, triangle, line-mode triangle); its geometry such as window and eye coordinates, normal, color, and texture coordinates at the vertices of the primitive; and the rendering state such as the PixelModes, TextureA, TextureB,, Light, Material, and Stipple applicable to the primitive. This information is saved in the polygon memory by MEX.

MEX also attaches ColorPointers (ColorAddress, ColorOffset, and ColorType) to each primitive sent to SRT, which is in turn passed on to each of the VSPs of that primitive. MIJ decodes this pointer to retrieve the necessary information from the polygon memory. MIJ starts working on a frame after it receives a BeginFrame packet from CUL. The VSP processing for the frame begins when CUL is done with the first tile in the frame and MIJ receives the first VSP for that tile. The color pointer consists of three parts, the ColorAddress, ColorOffset, and ColorType. The ColorAddress points to the ColorVertex that completes the primitive. ColorOffset provides the number of vertices separating the ColorAddress from the dualoct that contains the MLM_ Pointer. The MLM_Pointer (Material Light Mode Pointer) is periodically generated by MEX and stored into PMEM and provides a series of pointers to find the shading modes that are used for a particular primitive. ColorType contains information about the type of the primitive, size of each ColorVertex, and the enabled edges for line mode triangles. The ColorVertices making up the primitive may be 2, 4, 6, or 9 dualocts long. MIJ decodes the ColorPointer to obtain addresses of the dualocts containing the MLM_Pointer, and all the ColorVertices that make up the primitive. The $MLM_{13}$ Pointer (MLMP) contains the dualoct address of the six state packets in polygon memory.

MIJ is responsible for the following: (a) Routing various control packets such as BeginFrame, EndFrame, and Begin Tile to FRG and PIX; (b) Routing prefetch packets from SRT to PIX ;(c) Determining the ColorPointer for all the vertices of the primitive corresponding to the VSP; (d) Determining the location of the MLMP in PMEM and retrieving it; (e) Determining the location of various state packets in PMEM; (f) Determining which packets need to be retrieved; (g) Associating the state with each VSP received from CUL; (h) Retrieving the state packets and color vertex packets from PMEM; (i) Depending on the primitive type of the VSP, MIJ retrieves the required vertices and per-vertex data from PMEM and constructs primitives; (j) Keeping track of the contents of the Color, TexA, TexB, Light, and Material caches (for FRG, TEX, and PHG) and PixelMode and Stipple caches (for PIX) and associating the appropriate cache pointer to each cache miss data packet; and (k) Sending data to FRG and PIX.

MIJ may also be responsible for (l) Processing stalls in the pipeline, such as for example stalls caused by lack of PMEM memory space; and (m) Signaling to MEX when done with stored data in PMEM so that the memory space can be released and used for new incoming data. Recall that MEX writes to PMEM and MIJ reads from PMEM. A communication path is provided between MEX and MIJ for memory status and control information relative to PMEM usage and availability. MIJ thus deals with the retrieval of state as well as the per-vertex data needed for computing the final colors for each fragment in the VSP. MIJ is responsible for the retrieval of the state and any other information associated with the state pointer (MLMP) when it is needed. It is also responsible for the repackaging of the information as appropriate. An example of the repackaging occurs when the vertex data in PMEM is retrieved and bundled into primitive input packets for FRG. In at least one embodiment of the invention, the data contained in the VSP communicated from MIJ to FRG may be different than the data in the VSP communicated between MIJ and PIX. The VSP communicated to FRG also includes an identifier added upstream in the pipeline that identifies the type of a Line (VspLin), Point (VspPnt), or Triangle (VspTri). The Begin Tile packet is communicated to both PIX and to FRG from MIJ. Table 9 identifies signals and packets communicated over the MIJ-PIX Interface, and Table 10 identifies signals and packets communicated over the MIJ-FRG Interface.

TABLE 9

MIJ->PIX Interface

MIJ-PIX Interface - Vsp
MIJ-PIX Interface - Begin Tile
MIJ-PIX Interface - Begin Frame
MIJ-PIX Interface - End Frame
MIJ-PIX Interface - Clear
MIJ-PIX Interface - PixelMode Fill
MIJ-PIX Interface - Stipple Fill
MIJ-PIX Interface - Prefetch Begin Tile
MIJ-PIX Interface - Prefetch End Frame
MIJ-PIX Interface - Prefetch Begin Frame

TABLE 10

MIJ->FRG Interface

MIJ-FRG Interface - Vsp (VspTri, VspLin, VspPnt)
MIJ-FRG Interface - Begin Tile
MIJ-FRG Interface - Color Cache Fill 0 (CCFill0)
MIJ-FRG Interface - Color Cache Fill 1 (CCFill1)
MIJ-FRG Interface - Color Cache Fill 2 (CCFill2)
MIJ-FRG Interface - TexA Fill Packet
MIJ-FRG Interface - TexB Fill Packet
MIJ-FRG Interface - Material Fill Packet
MIJ-FRG Interface - Light Fill Packet Fragment (FRG) 11000

The Fragment (FRG) block 11000 is primarily responsible for interpolation. It interpolates color values for Gouraud shading, surface normals for Phong shading, and texture coordinates for texture mapping. It also interpolates surface tangents for use in the bump mapping algorithm, if bump maps are in use. FRG performs perspective corrected interpolation using barycentric coefficients in at least one embodiment of the invention.

FRG is located after CUL and MIJ and before TEX, and PHG (including BUMP when bump mapping is used). In one embodiment, FRG receives VSPs that contain up to four fragments that need to be shaded. The fragments in a particular VSP always belong to the same primitive, therefore the fragments share the primitive data defined at vertices, including all the mode settings. FRG's main function is the receipt of VSPs (Vsp Packets), and interpolation of the polygon information provided at the vertices for all active fragments in a VSP. For this interpolation task it also utilizes packets received from other blocks.

At the output of FRG we still have VSPs. VSPs contain fragments. FRG can perform the interpolations of a given fragment in parallel, and fragments within a particular VSP can be done in an arbitrary order. Fully interpolated VSPs are forwarded by FRG to the TEX, and PHG in the same order as received by FRG. In addition, part of the data sent to TEX may include Level-of-Detail (LOD or $\lambda$) values. In one embodiment, FRG interpolates values using perspective corrected barycentric interpolation.

PHG receives full and not full performance VSP (Vsp-FullPerf, Vsp-NotFullPerfo, Texture-B Mode Cache Fill Packet (TexBFill), light cache Fill packet (LtFill), Material Cache Fill packet (MtFill), and Begin Tile Packet (BeginTile) from FRG over header and data busses. Note that here, full performance and not-full performance Vsp are communicated. At one level of the pipeline, four types are supported (e.g. full, ½, ⅓, and ¼ performance), and these are written to PMEM and read back to MIJ. However, in one embodiment, only three types are communicated from MIJ to FRG, and only two types from FRG to PHB. Not full performance here refers to ½ performance or less. These determinations are made based on available bandwidth of on-chip communication and off-chip communications and other implementation related factors.

We note that in one embodiment, FRG and TEX are coupled by several busses, a 48-bit (47:0) Header Bus, a 24-bit (23:0) R-Data Interface Bus, a 48-bit (47:0) ST-Data Interface Bus, and a 24-bit (23:0) LOD-Data Interface Bus. VSP data is communicated from FRG to TEX over each of these four busses. A TexA Fill Packet, a TexB Fill Packet, and a Begin Tile Packet are also communicated to TEX over the Header Bus. Multiple busses are conveniently used; however, a single bus, though not preferred, may alternatively be used. Table 11 identifies signals and packets communicated over the FRG-PHG Interface, and Table 12 identifies signals and packets communicated over the FRG-TEX Interface.

TABLE 11

FRG->PHG Interface

FRG->PHB Full Performance Vsp
FRF->PHB Not Full Performance Vsp (½, ⅓, etc.)
FRG->PHB Begin Tile
FRG->PHB Material Fill Packet
FRG->PHB Light Fill Packet
FRG->PHB TexB Fill Packet
FRG->PHB Begin Tile

TABLE 12

FRG->TEX Interface

FRG->TEX Header Bus - Vsp
FRG->TEX ST-Data Bus - Vsp
FRG-TEX R-Data Bus - Vsp
FRG-TEX LOD-Data Bus - Vsp
FRG->TEX Header Bus - Begin Tile
FRG->TEx Header Bus - TexA Cache Fill Packet
FRG->TEX Header Bus - TexB Cache Fill Packet Texture (TEX) 12000 and Texture Memory (TMEM) 13000

The Texture block 12000 applies texture maps to the pixel fragments. Texture maps are stored in the Texture Memory (TMEM) 13000. TMEM need only be single-buffered. It is loaded from the host (HOST) computer's memory using the AGP/AGI interface. A single polygon can use up to four textures. Textures are advantageously mip-mapped, that is, each texture comprises a plurality or series of texture maps at different levels of detail, each texture map representing the appearance of the texture at a given magnification or minification. To produce a texture value for a given pixel fragment, TEX performs tri-linear interpolation (though other interpolation procedures may be used) from the texture maps, to approximate the correct level of detail for the viewing distance. TEX also performs other interpolation methods, such as anisotropic interpolation. TEX supplies interpolated texture values (generally as RGBA color values) in the form of Vsp Packets to the PHG on a per-fragment basis. Bump maps represent a special kind of texture map. Instead of a color, each texel of a bump map contains a height field gradient.

Polygons are used in 3D graphics to define the shape of objects. Texture mapping is a technique for simulating surface textures by coloring polygons with detailed images or patterns. Typically, a single texture map will cover an entire object that consists of many polygons. A texture map consists of one or more nominally rectangular arrays of RGBA color. In one embodiment of the invention, these rectangular arrays are about 2 kB by 2 kB in size. The user supplies coordinates, either manually or automatically in GEO, into the texture map at each vertex. These coordinates are interpolated for each fragment, the texture values are looked up in the texture map and the color assigned to the fragment.

Because objects appear smaller when they're farther from the viewer, texture maps must be scaled so that the texture pattern appears the same size relative to the object being textured. Scaling and filtering a texture image for each fragment is an expensive proposition. Mip-mapping allows the renderer to avoid some of this work at run-time. The user provides a series of texture arrays at successively lower resolutions, each array representing the texture at a specified level of detail (LOD or $\lambda$). Recall that FRG calculates a level of detail value for each fragment, based on its distance from the viewer, and TEX interpolates between the two closest mip-map arrays to produce a texture value for the fragment. For example, if a fragment has I=0.5, TEX interpolates between the available arrays representing I=0 and I=1. TEX identifies texture arrays by virtual texture number and LOD.

In addition to the normal path between TMEM and TEX, there is a path from host (HOST) memory to TMEM via AGI, CFD, 2DG to TMEM which may be used for both read and write operations. TMEM stores texture arrays that TEX is currently using. Software or firmware procedures manage TMEM, copying texture arrays from host memory into TMEM. It also maintains a table of texture array addresses in TMEM. TEX sends filtered texels in a VSP packet to PHG and PHG interprets these. Table 13 identifies signals and packets communicated over the TEX-PHG Interface.

TABLE 13

TEX->PHG Interface

TEX->PHB Interface - Vsp

Phong Shading (PHG or PHB) 14000

The Phong (PHG or PHB) block 14000 is located after TEX and before PIX in DSGP 1000 and performs Phong shading for each pixel fragment. Generic forms of Phong shading are known in the art and the theoretical underpinnings of Phong shading are therefore not described here in detail, but rather are described in the related applications. PHG may optionally but desirably include Bump Mapping (BUMP) functionality and structure. TEX sends only texel data contained within Vsp Packets and PHG receives Vsp Packets from TEX, in one embodiment this occurs via a 36-bit (35:0) Textel-Data Interface bus. FRG sends per-fragment data (in VSPs) as well as cache fill packets that are passed through from MIJ. It is noted that in one embodiment, the cache fill packets are stored in RAM within PHG until needed. Fully interpolated stamps are forwarded by FRG to PHG (as well as to TEX and BUMP within PHG) in the same order as received by FRG. Recall that PHG receives full performance VSP (Vsp-FullPerf) and not full performance VSP (Vsp-NotFullPerf) packets as well as Texture-B Mode Cache Fill Packet (TexBFill, Light Cache Fill packet (LtFill), Material Cache Fill packet (MtFill), and Begin Tile Packet (BeginTile) from FRG over header and data busses. Recall also that MIJ keeps track of the contents of the Color, TexA, TexB, Light, and Material caches for PHG (as well as for FRG and TEX) and associates the appropriate cache pointer to each cache miss data packet.

PHG uses the material and lighting information supplied by MIJ, the texture colors from TEX, and the interpolated data generated by FRG, to determine a fragment's apparent color. PHG calculates the color of a fragment by combining the color, material, geometric, and lighting information received from FRG with the texture information received from TEX. The result is a colored fragment, which is forwarded to PIX where it is blended with any color information already residing in the frame buffer (FRM). PHG is primarily geometry based and does not care about the concepts of frames, tiles, or screen-space.

PHG has three internal caches: the light cache (Lt Cache Fill Packet from MIJ), the material cache (Material Cache Fill Packet from MIJ), and the textureB (TexB) cache.

Only the results produced by PHG are sent to PIX. These include a packet that specifies the properties of a fragment (Color Packet), a packet that specifies the properties of a fragment (Depth_Color Packet), a packet that specifies the properties of a fragment (Stencil_Color Packet), a packet that specifies the properties of a fragment (ColorIndex Packet), a packet that specifies the properties of a fragment (Depth_ColorIndex Packet), and a packet that specifies the properties of a fragment (Stencil_ColorIndex Packet). Table 14 identifies signals and packets communicated over the PHG-PIX Interface,

TABLE 14

PHG->PIX Interface

PHB->PIX Interface - Color
PHB->PIX Interface - Depth_Color
PHB->PIX Interface - Stencil_Color
PHB->PIX Interface - ColorIndex
PHB->PIX Interface - Depth_ColorIndex
PHB->PIX Interface - Stencil_ColorIndex Pixel (PIX) 15000

The Pixel (PIX) block 15000 is the last block before BKE in the 3D pipeline and receives VSPs, where each fragment has an independent color value. It is responsible for graphics API per-fragment and other operations including scissor test, alpha test, stencil operations, depth test, blending, dithering, and logic operations on each sample in each pixel (See for example, OpenGL Spec 1.1, Section 4.1, "Per-Fragment Operations," herein incorporated by reference). The pixel ownership test is a part of the window system (See for example Ch. 4 of the OpenGL 1.1 Specification, herein incorporated by reference) and is done in the Backend. When PIX has accumulated a tile's worth of finished pixels, it blends the samples within each pixel (thereby performing antialiasing of pixels) and sends them to the Backend (BKE) block 16000, to be stored in the frame buffer (FRM) 17000. In addition to this blending, the PIX performs stencil testing, alpha blending, and antialiasing of pixels. When it accumulates a tile's worth of finished pixels, it sends them to BKE to be stored in the frame buffer FRM. In addition to these operations, Pixel performs sample accumulation for antialiasing.

The pipeline stages before PIX convert the primitives into VSPs. SRT collects the primitives for each tile. CUL receives the data from SRT in tile order, and culls out or removes parts of the primitives that definitely do not contribute to the rendered images. CUL generates the VSPS. TEX and PHG also receive the VSPs and are responsible for the texturing and lighting of the fragments respectively.

PIX receives VSPs (Vsp Packet) and mode packets (Begin Tile Packet, BeginFrame Packet, EndFrame Packet, Clear Packet, PixelMode Fill Packet, Stipple Fill Packet, Prefetch Begin Tile Packet, Prefetch End Frame Packet, and Prefetch Begin Frame Packet) from MIJ, while: fragment colors (Color Packet, Depth$_{13}$ Color Packet, Stencil_Color Packet, ColorIndex Packet, Depth_ColorIndex Packet, and Stencil_ColorIndex Packet) for the VSPs are received from PHG. PHG can also supply per-fragment z-coordinate and stencil values for VSPs.

Fragment colors (Color Packet, Depth_Color Packet, Stencil_Color Packet, ColorIndex Packet, Depth_ColorIndex Packet, and Stencil_ColorIndex Packet) for the VSPs arrive at PIX in the same order as the VSPs arrive. PIX processes the data for each visible sample according to the applicable mode settings. A pixel output (PixelOut) subunit processes the pixel samples to generate color values, z values, and stencil values for the pixels. When PIX finishes processing all stamps for the current Tile, it signals the pixel out subunit to output the color buffers, z-buffers, and stencil buffers holding their respective values for the Tile to BKE.

BKE prepares the current tile buffers for rendering of geometry (VSPs) by PIX. This may, involve loading the existing color values, z values, and stencil values from the frame buffer. BKE includes a RAM (RDRAM) memory controller for the frame buffer.

PIX also receives some packets bound for BKE from MIJ. An input filter appropriately, passes these packets on to a BKE Prefetch Queue, where they are processed in the order received. It is noted that several of the functional blocks, including PIX, have an "input filter" that selectively routes packets or other signals through the unit, and selectively "captures" other packets or signals for use within the unit.

Some packets are also sent to a queue in the pixel output subunit. As described herein before, PIX receives inputs from MIJ and PHG. There are two input queues to handle these two inputs. The data packets from MIJ go to the VSP queue and the fragment Color packets and the fragment depth packets from PHG go to the Color queue. PIX may also receive some packets bound for BKE. Some of the packets are also copied into the input queue of the pixel output subunit.

BKE and the pixel output subunit process the data packets in the order received. MIJ places the data packets in a PIX input First-In-First-Out (FIFO) buffer memory. A PIX input filter examines the packet header, and sends the data bound for BKE to BKE, and the data packets needed by PIX to the VSP queue. The majority of the packets received from MIJ are bound for the VSP queue, some go only to BKE, and some are copied into the VSP queue as well as sent to BKE and pixel output subunit of PIX.

Communication between PIX and BKE occurs via control lines and a plurality of tile buffers, in one embodiment the tile buffers comprise eight RAMs. Each tile buffer is a 16×16 buffer which BKE controls. PIX requests tile buffers from BKE via the control lines, and BKE either acquires the requested memory from the Frame buffer (FRM) or allocates it directly when it is, available. PIX then informs BKE when it is finished with the tile buffers via the control lines.

Backend (BKE) 16000

The Backend (BKE) 16000 receives pixels from PIX, and stores them into the frame buffer (FRM) 17000. Communication between BKE and PIX is achieved via the control lines and tile buffers as described above, and not packetized. BKE also (optionally but desirable) sends a tile's worth of pixels back to PIX, because specific Frame Buffer (FRM) values can survive from frame to frame and there is efficiency in reusing them rather than recomputing them. For example, stencil bit values can be constant over many frames, and can be used in all those frames.

In addition to controlling FRM, BKE performs 2D drawing and sends the finished frame to the output devices. It provides the interface between FRM and the Display (or computer monitor) and video output.

BKE mostly interacts with PIX to read and write 3D tiles, and with the 2D graphics engine (TDG) 18000 to perform Blit operations. CFD uses the BKE bus to read display lists from FRM. The BKE Bus (including a BKE Input Bus and a BKE Output Bus) is the interconnect that interfaces BKE with the Two-Dimensional Graphics Engine (TDG) 18000, CFD, and AGI, and is used to read and write into the FRM Memory and BKE registers. AGI reads and writes BKE registers and the Memory Mapped Frame Buffer data. External client units (AGI, CFD and TDG) perform memory read and write through the BKE. The main BKE functions are: (a) 3D Tile read, (b) 3D Tile write using Pixel Ownership, (c) Pixel Ownership for write enables and overlay detection, (d) Scanout using Pixel Ownership, (e) Fixed ratio zooms, (f) 3D Accumulation Buffer, (g) Frame Buffer read and writes, (h) Color key to Windows ID (winid) map, (i) VGA, and (j) RAMDAC.

The 3D pipeline's interaction with BKE is driven by BeginFrame, BeginTile, and EndFrame packets. Prefetch versions of these packets are sent directly from SRT to the BKE so that the tiles can be prefetched into the PIX-BKE pixel buffers.

BKE interfaces with PIX using a pixBus and a prefetch queue. The pixBus is a 64-bit bus at each direction and is used to read and write the pixel buffers. There are up to 8 pixel buffers, each holding 32 bit color or depth values for a single tile. If the window has both color and depth planes enabled then two buffers are allocated. BKE read or writes to a single buffer at a time. BKE first writes the color buffer and then if needed the depth buffer values. PIX receives BeginFrame and BeginTile packets from the prefetch queue. These packets bypass the 3D pipeline units to enable prefetching of the tile buffers. The packets are duplicated for this purpose, the remaining units receiving them ordered with other VSP and mode packets. In addition to Begin-Frame and BeginTile packets, BKE receives End of Frame packets that mainly is used to send a programmable interrupt. A pixel ownership unit (POBox) performs all necessary pixel ownership functions. It provides the pixel write mask for 3D tile writes. It also determines if there is an overlay (off-screen) buffer on scan out. It includes the window ID table that holds the parameters of 64 windows. A set of 16 bounding boxes (BB) and an 8-bit WinID map per-pixel mechanisms are used in determining the pixel ownership. Pixel ownership for up to 16 pixels at time can be performed as a single operation. The 2DG and AGI can perform register read and writes using the bkeBus. These registers are typically 3D independent registers. Register updates in synchronization with the 3D pipe are performed as mode operations or are set in Begin or End packets. CFD reads Frame Buffer resident compiled display lists and interleaved vertex arrays using the bkeBus. CFD issues read requests of four dualocts (64 Bytes) at a time when reading large lists. TDG reads and writes the Frame Buffer for 2D Blits. The source and destination could be the host memory, the Frame Buffer, the auxiliary ring for the Texture Memory and context switch state for the GEO and CFD.

In one embodiment, the BkeBus is a 72-bit input and 64-bit output bus with few handshaking signals. Arbitration is performed by BKE. Only one unit can own the bus at a time. The bus is fully pipelined and multiple requests can be on the fly at any given cycle. The external client units that perform memory read and write through the BKE are AGI and TDG, and CFD reads from the Frame Buffer via AGI's bkeBus interface. A MemBus is the internal bus used to access the Frame Buffer memory.

BKE effectively owns or controls the Frame Buffer and any other unit that needs to access (read from or write to) the frame buffer must communicate with BKE. PIX communicates with BKE via control signals and tile buffers as already described. BKE communicates with FRM (RAMBUS RDRAM) via conventional memory communication means. The 2DG block communicates with BKE as well, and can push data into the frame buffer and pull data out of the frame buffer and communicate the data to other locations.

Frame Buffer (FRM) 17000

The Fraine Buffer (FRM) 17000 is the memory controlled by BKE that holds all the color and depth values associated with 2D and 3D windows. It includes the screen buffer that is displayed on the monitor by scanning-out the pixel colors at refresh rate. It also holds off-screen overlay and .buffers (p-buffers), display lists and vertex arrays, and accumulation buffers. The screen buffer and the 3D p-buffers can be dual buffered. In one embodiment, FRM comprises RAMBUS RD random access memory.

Two-Dimensional Graphics (TDG or 2DG) 18000

The Two-Dimensional Graphics (TDG or 2DG) Block 18000 is also referred to as the two-dimensional graphics engine, and is responsible for two-dimensional graphics (2D graphics) processing operations. TDG is an optional part of the inventive pipeline, and may even be considered to be a different operational unit for processing two-dimensional data.

The TDG mostly talks to the bus interface AGI unit, the front end CFD unit and the backend BKE unit. In most desired cases (PULL), all 2D drawing commands are passed through from the CFD unit (AGP master or faster write). In low performance cases (PUSH), the commands can be programmed from AGI (in PIO mode from PCI slave). The return data from register or memory read is passed to the AGI. One the other side, to write or read the memory, the TDG passes memory request packets (including the address, data and byte enable) to the BKE or receives the memory read return data from the BKE. To process the auxiliary ring command, TDG also talks to everybody else on the ring.

We first describe certain input packets to BKE. The 2D source request and data return packet received as an input from AGI is used to handle the 2D data pull-in/push-out from/to the AGP memory. The PCI packet received as an input from AGI is used to handle all slave mode memory or I/O read or write accesses. The 2D command packet received as an input from CFD is used to pass formatted commands. The frame buffer write request acknowledge and read return data packet received as an input from BKE is used to pass the DRDRAM data returned from the BKE, in response to an earlier frame buffer read request. The auxiliary ring input packet received as an input from BKE moves uni-directionally from unit to unit. TDG receives it from BKE, takes proper actions and then deliver this packet or a new packet to the next unit AGI.

The 2D AGP data request and data out packet sent to AGI is used to send the AGP master read/write request to AGI and follow the write request, the data output packet to the AGI. The PCI write acknowledge and read return data packet sent to AGI is used to acknowledge the reception of PCI memory or I/O write data, and also handles the return of PCI memory or I/O read data. The auxiliary ring output packet sent to AGI moves uni-directionally from unit to unit; TDG receives it from BKE, takes proper actions and then deliver this packet or a new packet to the next unit AGI. The 2D command acknowledge packet sent to CFD is used to acknowledge the reception of the command data from CFD. The frame buffer read/write request and read data acknowledge packet sent to BKE passes the frame buffer read or write command to the BKE. For read, both address and byte enable lines are used, and for write command data lines are also meaningful.

In one particular embodiment of the invention, support of a "2D-within-3D" implementation is conveniently provided using pass-thru 2D commands (referred to as "Tween" Packets) from BKE unit. The 2D pass-thru command (tween) packet received as an input from BKE is used to pass formatted 2D drawing command packets that is in the 3D pipeline. The 2D command pass-thru (tween) acknowledge packet sent to BKE is used to acknowledge the reception of the command data from BKE.

Display (DIS)

The Display (DIS) may be considered a separate monitor or display device, particularly when the signal conditioning circuitry for generating analog signals from the final digital input are provided in BKE/FRM.

Multi-Chip Architecture

In one embodiment the inventive structure is disposed on a set of three separate chips (Chip 1, Chip 2, and Chip 3) plus additional memory chips. Chip 1 includes AGI, CFD, GEO, PIX, and BKE. Chip 2 includes MEX, SRT, STP, and CULL. Chip 3 includes FRG, TEX, and PHG. PMEM, SMEM, TMEM, and FRM are provided on seprate chips. An inter-chip communication ring is provided to couple the units on the chips for communication. In other embodiments of the invention, all functional blocks are provided on a single chip (common semiconductor substrate) which may also include memory (PMEM, SMEM, TMEM, and the like) or memory may be provided on a separate chip or set of chips.

Additional Description

The invention provides numerous innovative structures, methods, and procedures. The structures take many forms including individual circuits, including digital and circuits, computer architectures and systems, pipeline architectures and processor connectivity. Methodologically, the invention provides a procedure for deferred shading and numerous other innovative procedures for use with a deferred shader as well as having applicability to non-deferred shaders and data processors generally. Those workers having ordinary skill in the art will appreciate that although the numerous inventive structures and procedures are described relative to a three-dimensional graphical processor, that many of the innovations have dear applicability to two-dimensional processing, and to data processing and manipulation are involved generally. For example, many of the innovations may be implemented in the context of general purpose computing devices, systems, and architectures. It should also be understood that while some embodiments may require or benefit from hardware implementation, at least some of the innovations are applicable to either hardware or software/firmware implementations and combinations thereof.

A brief list of some of the innovative features provided by the above described inventive structure and method is provided immediately below. This list is exemplary, and should not be interpreted as a limitation. It is particularly noted that the individual structures and procedures described herein may be combined in various ways, and that these combinations have not been individually listed. Furthermore, while this list focuses on the application of the innovations to a three-dimensional graphics processor, the innovations may readily be applied to a general purpose computing machine having the structures and/or operation described in this specification and illustrated in the figures.

The invention described herein provides numerous inventive structures and methods, included, but not limited to structure and procedure for: Three-Dimensional Graphics Deferred Shader Architecture; Conservative Hidden Surface Removal; Tile Prefetch; Context Switching; Multipass by SRT for Better Antialiasing; Selection of Sample Locations; Sort Before Setup; Tween Packets; Packetized Data Transfer; Alpha Test, Blending, Stippled Lines, and the like; Chip Partitioning; Object Tags (especially in Deferred Shading Architecture); Logarithmic Normalization in Color Space (Floating Point Colors); Backend Microarchitecture; Pixel Zooming During Scanout; Virtual Block Transfer (BLT) on Scanout; Pixel Ownership; Window ID; Blocking and Non-blocking Interrupt Mechanism; Queuing Mechanisms; Token Insertion for Vertex Lists; Hidden Surface Removal; Tiled Content Addressable Z-buffer; three-stage Z-buffer Process; dealing with Alpha Test and Stencil in a Deferred Shader; Sending Stamps Downstream with Z Ref and Dz/dx and Dx/dy; Stamp Portion Memory Separate from the Z-buffer Memory; Sorted Transparency Algorithm; Finite State Machine per Sample; a SAM Implementation; Fragment Microarchitecture; GEO Microarchitecture; Pipestage Interleaving; Polygon Clipping Algorithm; 2-Dimensional Block Microarchitecture; Zero-to-one Inclusive Multiplier (Mul-18p); Integer-floating-integer (Ifi) Match Unit; Taylor Series Implementation; Math Block Construction Method; Multi-chip Communication Ring Graphics; How to Deal with Modes in a Deferred Shader; Mode Catching; MLM Pointer Storage; Clipped Polygons in Sort Whole in Polygon Memory; Phong/bump Microarchitecture; Material-tag-based Resource Allocation of Fragment Engines; Dynamic Microcode Generation for Texture Environment and Lighting; How to Do Tangent Space Lighting in a Deferred Shading Architecture; Variable Scale Bump Maps; Automatic Basis Generation; Automatic Gradient-field Generation Normal Interpolation by Doing Angle and Magnitude Separately; Post-tile-sorting Setup Operations in Deferred Shader; Unified Primitive Description; Tile-relative Y-values and Screen Relative X-values; Hardware Tile Sorting; Enough Space Look ahead Mechanism; Touched Tile Implementation; Texture Re-use Matching Registers (Including Deferred Shader); Samples Expanded to Pixels (Texture Miss Handling); Tile Buffers and Pixel Buffers (Texture Microarchitecture); and packetized data transfer in a processor.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A graphics pipeline generating a rendered image in a frame buffer, the image being generated from a plurality of graphics primitives, the graphics pipeline comprising:

(1) a sort block comprising:

logic sorting the graphics primitives into a plurality of tiles, each of the tiles being an area within the image, the tiles each being rendered separately;

logic selecting one of the tiles;

logic generating a first indicator designating a beginning of the rendering of the selected tile, the first indicator being sent to one or more rendering blocks in the pipeline;

logic generating a second indicator designating the beginning of the rendering of the selected tile, the second indicator bypassing the one or more rendering blocks in the pipeline; and logic sending the graphics primitives that touch the selected tile down the pipeline after the first indicator is sent down the pipeline;

(2) the one or more rendering blocks comprising:

logic receiving the first indicator;

logic receiving the graphics primitives that touch the selected tile;

logic generating image color values for the received graphics primitives; and logic outputting the first indicator and the generated image color values;

(3) a backend block comprising:

logic controlling the frame buffer;

logic receiving the second indicator; and logic reading image data from the frame buffer corresponding to the selected tile as designated in the second indicator, generating a third indicator designating the image data has been read; and (4) a pixel block comprising:

logic receiving the first indicator and the third indicator, thereby synchronizing, for the selected tile, the generated image color values and the read image data; and logic receiving the generated image color values and combining the generated image color values and the read image data.

2. The graphics pipeline of claim 1, further comprising:

one or more memories storing the read image data, the read image data in the memories being overwritten with the combined generated image color values and the read image data.

3. The graphics pipeline of claim 1, the second indicator further designating whether any of color values, z values, and stencil values need to be read from the frame buffer for the selected tile.

4. The graphics pipeline of claim 1, the pixel block further comprising:

logic computing depth values corresponding to the generated image color values, the depth values being used for a depth test.

5. The graphics pipeline of claim 1, the pixel block further comprising:

logic performing fragment operations including a fragment operation selected from the group consisting of: a scissor test, an alpha test, a stencil test, a depth test, blending, dithering, logicop, and combinations thereof.

6. The graphics pipeline of claim 1, the one or more rendering blocks further comprising:

a cull block determining the visible fragments within the received graphics primitives, the image color values being generated only for the determined visible fragments.

7. The graphics pipeline of claim 1, the one or more rendering blocks further comprising:

a lighting block performing per-fragment lighting.

8. The graphics pipeline of claim 7, the lighting further comprising:

logic computing Phong shading, the Phong shading contributing to the generation of image color values.

9. The graphics pipeline of claim 1, further comprising:

a two-dimensional graphics block performing two-dimensional graphics processing operations, the two-dimensional graphics processing operations being performed in parallel with the generation of image color values.

10. A graphics rendering method generating a rendered image in a frame buffer, the image being generated from a plurality of graphics primitives, the method comprising the steps:

sorting the graphics primitives into a plurality of tiles, each of the tiles being an area within the image, the tiles each being rendered separately;

selecting one of the tiles;

generating a first sequence of data comprising a first indicator followed by the graphics primitives that touch the selected tile, the first indicator designating a beginning of the rendering of the selected tile;

generating a second indicator requesting image data corresponding to the selected tile from the frame buffer;

reading the requested image data from the frame buffer and generating a third indicator when the reading is completed;

generating a second sequence of data comprising the first indicator followed by generating image color values for the selected tile, the generating image color values being generated from the graphics primitives that touch the selected tile;

combining, according to one or more programmatically specified fragment operations, the generated image color values and the read image data, the generated image color values for the selected tile and the read image data for the selected tile being synchronized by associating the first indicator and the third indicator.

11. The method of claim 10, the second indicator designating whether any of color values, z values, and stencil values need to be read from the frame buffer for the selected tile.

12. The method of claim 10, the combining step further comprising:

computing depth values corresponding to the generated image color values, the depth values being used for a depth test.

13. The method of claim 10, the combining step further comprising:

performing at least one fragment operation selected from the group consisting of: a scissor test, an alpha test, a stencil test, a depth test, blending, dithering, logicop, and combinations thereof.

14. The method of claim 10, further comprising the step:

determining the visible fragments within the graphics primitives, the image color values being generated only for the determined visible fragments.

15. The method of claim 10, further comprising the step: performing per-fragment lighting.

16. The method of claim 10, further comprising the step:

computing Phong shading, the Phong shading contributing to the generation of image color values.

17. A graphics pipeline generating a rendered image in a frame buffer, the image being generated from a plurality of graphics primitives, the graphics pipeline comprising:

(1) logic sorting the graphics primitives into a plurality of tiles, each of the tiles being an area within the image, the tiles each being rendered separately;

(2) shading logic generating image color values for the sorted graphics primitives in one of the separately rendered tiles;

(3) logic generating a prefetch indicator for the one of the separately rendered tiles, causing image data to be read from the frame buffer in parallel with the shading logic generating image color values; and (4) pixel logic combining the generated image color values and the read image data.

18. The graphics pipeline of claim 17, further comprising:

one or more memories storing the read image data, the read image data in the memories being overwritten with the combined generated image color values and the read image data.

19. The graphics pipeline of claim 17, the prefetch indicator further designating whether any of color values, z values, and stencil values need to be read from the frame buffer for the one of the separately rendered tiles.

20. The graphics pipeline of claim 17, the pixel logic further comprising:

logic computing depth values corresponding to the generated image color values, the depth values being used for a depth test.

21. The graphics pipeline of claim 17, the pixel logic further comprising:

logic performing at least one fragment operation selected from the group consisting of: a scissor test, an alpha test, a stencil test, a depth test, blending, dithering, logicop, and combinations thereof.

22. The graphics pipeline of claim 17, further comprising:

logic determining the visible fragments within the received graphics primitives, the image color values being generated only for the determined visible fragments.

23. The graphics pipeline of claim 17, further comprising: logic performing per-fragment lighting.

24. The graphics pipeline of claim 17, further comprising:

logic performing two-dimensional graphics processing operations, the two-dimensional graphics processing operations being performed in parallel with the generation of image color values.

25. A graphics rendering method generating a rendered image in a frame buffer, the image being generated from a plurality of graphics primitives, the method comprising the steps:

(1) sorting the graphics primitives into a plurality of tiles, each of the tiles being an area within the image, the tiles each being rendered separately;

(2) generating image color values for the sorted graphics primitives in one of the separately rendered tiles;

(3) generating a prefetch indicator for the one of the separately rendered tiles, causing image data to be read from the frame buffer in parallel with the step of generating image color values; and (4) combining the generated image color values and the read image data.

26. The method of claim 25, the prefetch indicator designating whether any of color values, z values, and stencil values need to be read from the frame buffer for the one of the separately rendered tiles.

27. The method of claim 25, the combining step further comprising:

computing depth values corresponding to the generated image color values, the depth values being used for a depth test.

28. The method of claim 25, the combining step further comprising:

performing at least one fragment operation selected from the group consisting of: a scissor test, an alpha test, a stencil test, a depth test, blending, dithering, logicop, and combinations thereof.

29. The method of claim 25, further comprising the step:

determining the visible fragments within the graphics primitives, the image color values being generated only for the determined visible fragments.

30. The method of claim 25, further comprising the step: performing per-fragment lighting.

31. A graphics rendering method generating a rendered image in a frame buffer, the image being generated from a plurality of graphics primitives, the frame buffer storing data comprising color values, z values, and stencil values, the method comprising the steps:

(1) dividing the area of the image into a plurality of tiles, the tiles each being rendered separately;

(2) detecting a condition of an application program specifying one or more buffer clear operations during an early stage of the generation of the rendered image, such that the rendered image can not be affected by the previous one or more of color values, z values, and color values stored in the frame buffer;

(3) conditionally reading, for a selected tile, color values, z values, and stencil values from the frame buffer into a tile buffer, some of the reading being avoided if the condition is detected; and (4) rendering the image for the selected tile.

* * * * *